United States Patent
Ikeda

(10) Patent No.: US 12,384,483 B2
(45) Date of Patent: Aug. 12, 2025

(54) SHOCK ABSORBER AND SADDLE-TYPE VEHICLE

(71) Applicant: Hitachi Astemo, Ltd., Hitachinaka (JP)

(72) Inventor: Daisuke Ikeda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 821 days.

(21) Appl. No.: 17/547,130

(22) Filed: Dec. 9, 2021

(65) Prior Publication Data
US 2022/0097794 A1    Mar. 31, 2022

Related U.S. Application Data

(63) Continuation of application No. PCT/JP2019/029996, filed on Jul. 31, 2019.

(51) Int. Cl.
| | |
|---|---|
| B62K 25/08 | (2006.01) |
| B62K 25/04 | (2006.01) |
| F16F 9/44 | (2006.01) |

(52) U.S. Cl.
CPC ............... B62K 25/08 (2013.01); F16F 9/44 (2013.01); *B62K 2025/044* (2013.01)

(58) Field of Classification Search
CPC .. B62K 25/08; B62K 25/10; B62K 2025/044; F16F 9/44; F16F 9/446; F16F 9/182
See application file for complete search history.

(56) References Cited

U.S. PATENT DOCUMENTS

| | | | | |
|---|---|---|---|---|
| 3,997,037 A * | 12/1976 | Schupner | ............... | F16F 9/44 188/315 |
| 4,013,149 A * | 3/1977 | Fabre | ............... | B62K 25/08 188/322.22 |
| 4,036,335 A * | 7/1977 | Thompson | ............... | B60G 17/08 188/319.1 |
| 2016/0201752 A1* | 7/2016 | Kim | ............... | F16F 9/3415 188/280 |
| 2016/0369862 A1* | 12/2016 | Miwa | ............... | F16F 9/185 |
| 2017/0282994 A1* | 10/2017 | Murakami | ............... | B60G 11/56 |
| 2018/0105225 A1 | 4/2018 | Tomiuga | | |

(Continued)

FOREIGN PATENT DOCUMENTS

| | | |
|---|---|---|
| DE | 112018008004 T5 | 6/2021 |
| JP | 10009326 A | 1/1998 |

(Continued)

OTHER PUBLICATIONS

German Office Action mailed Oct. 30, 2023 for the corresponding German Patent Application No. 112019007312.5 (6 pages including English translation).

(Continued)

*Primary Examiner* — Valentin Neacsu
*Assistant Examiner* — Abigail R Hymel
(74) *Attorney, Agent, or Firm* — Leason Ellis LLP; Edward J. Ellis; Melvin C. Garner

(57) ABSTRACT

A shock absorber includes a cylinder, a rod, a first damping force generating portion, and a second damping force generation portion. The second damping force generating portion includes a flow path which passes through the piston in the axial direction, a valve which opens and closes an opening portion at the second end portion side of the flow path, and an adjustment unit which adjusts a force required to open the valve from an outer side of the rod.

18 Claims, 12 Drawing Sheets

(56) References Cited

U.S. PATENT DOCUMENTS

2019/0390730 A1* 12/2019 Russell .................. B60G 13/08
2021/0253194 A1   8/2021 Morishita

FOREIGN PATENT DOCUMENTS

| JP | 2010270832 A | 12/2010 |
| JP | 2012047341 A |  3/2012 |
| JP | 2013122255 A |  6/2013 |
| JP | 2016205478 A | 12/2016 |
| JP | 2017082861 A |  5/2017 |
| JP | 2017172739 A |  9/2017 |

OTHER PUBLICATIONS

International Search Report mailed Sep. 24, 2019 for the corresponding PCT International Patent Application No. PCT/JP2019/029996.

* cited by examiner

SHOCK ABSORBER AND SADDLE-TYPE VEHICLE

CROSS-REFERENCE TO RELATED APPLICATION(S)

This application is a continuation of PCT application No. PCT/JP2019/029996, which was filed on Jul. 31, 2019, the content of which is incorporated herein by reference in its entirety.

FIELD OF THE INVENTION

The present invention relates to a shock absorber and a saddle-type vehicle.

BACKGROUND OF THE INVENTION

For example, a front fork disclosed in JP-A-2017-172739 includes an outer tube portion which is formed into a tubular shape and is positioned at a vehicle body side, and an inner tube portion which is formed into a tubular shape, is positioned at a wheel side, is connected to the outer tube portion, and moves relative to the outer tube portion in an axial direction of the outer tube portion. The front fork includes a cylindrical cylinder which is provided inside the outer tube portion and the inner tube portion and has a fragile portion at an outer circumference side in the axial direction, and a rod member which is positioned inside the outer tube portion and the inner tube portion and moves relative to the cylinder in the axial direction of the cylinder along with a movement of the outer tube portion and the inner tube portion. The front fork further includes a piston (first partition member) which is fixed to an end portion of the rod member, is provided in contact with the cylinder to be movable in the axial direction of the cylinder, partitions a space in the cylinder, and is provided with a damping mechanism which attenuates vibration generated due to a relative movement between the outer tube portion and the inner tube portion. The front fork further includes a piston (second partition member) which is disposed relative to the piston (first partition member) in the axial direction at a side where the cylinder is provided, partitions the space in the cylinder, and is provided with a damping mechanism, and a free piston (third partition member) which is disposed relative to the piston (second partition member) in the axial direction at a side where the cylinder is provided, partitions the space in the cylinder, and moves in the axial direction in the cylinder along with a movement of the rod member.

A damper portion of the front fork (shock absorber) disclosed in JP-A-2017-172739 generates a damping force in a low speed range in which a piston moves at a low speed. The front fork disclosed in JP-A-2017-172739 has a function of adjusting the damping force generated by the damper portion. However, in the front fork disclosed in JP-A-2017-172739, an adjustment of a damping force in a medium speed range in which the piston moves at a medium speed faster than the low speed, or in a high speed range in which the piston moves at a high speed faster than the medium speed can be further improved.

An object of the present invention is to provide a shock absorber and the like which can adjust a damping force over a large moving speed range of a piston.

SUMMARY OF THE INVENTION

Hereinafter, the present disclosure will be described. In the following description, reference numerals in the accompanying drawings are added in parentheses to facilitate understanding of the present disclosure, but the present disclosure is not limited to the following embodiments.

According to an aspect of the present invention, there is provided a shock absorber (1, 2, 3, 4, 5, 6). The shock absorber (1, 2, 3, 4, 5, 6) includes a cylinder (151) which has a first end portion in an axial direction thereof which is fixed to a vehicle body of a saddle-type vehicle, a rod (81) which holds a piston (83, 383) which slides in the cylinder at an end portion at a first end portion side of the rod (81), a second end portion of the rod being fixed to a front wheel side, the second end portion being at opposite side to the end portion at the first end portion side, a first damping force generating portion (190) which is fixed to the end portion at the first end portion side in the cylinder; and a second damping force generation portion (60, 260, 360, 460, 560, 660) which is disposed to be movable in the axial direction in the cylinder. The second damping force generating portion includes a flow path (83c, 383c) which passes through the piston in the axial direction, a valve (86, 286, 386, 486, 686) which opens and closes an opening portion at the second end portion side of the flow path, and an adjustment unit (90) which adjusts a force required to open the valve from an outer side of the rod.

Here, the adjustment unit (90) may include a first spring (91) which applies a force in a closing direction to the valve (86, 286, 386, 486, 686), a spring receiver (92) which supports an end portion at the second end portion side of the first spring, and an adjustment portion (96) which adjusts a position of the spring receiver.

The adjustment unit (90) may further include a first transmission member (95) which is disposed between an end portion at the first end portion side of the first spring (91) and the valve (86, 286, 386, 486) and transmits a force of the first spring to the valve.

The second damping force generating portion (460, 560, 660) may include a first support member (288, 488) which is disposed inside the first transmission member (95) and supports a surface at the second end portion side of the valve (86, 286, 486, 686), and a second spring (463) which is supported by the first support member at the first end portion side and applies a force in a closing direction to the valve.

The adjustment portion (96) may include a contact member (99) which is disposed inside the rod (81) and comes into contact with a second transmission member (97) which transmits a force to the spring receiver (92) by an end portion at the first end portion side, and an operation portion (185) which can change a position of the contact member by a rotation operation.

The flow path (83c, 383c) may include a first flow path (83c) and a second flow path (383c) which is provided outward of the first flow path in a radial direction of the piston (83, 383). The valve (86, 386, 686) may include a first valve (86, 686) which opens and closes an opening portion at the second end portion side of the first flow path, and a second valve (386) which opens and closes an opening portion at the second end portion side of the second flow path. The adjustment unit (90) may adjust a force required to open the second valve.

The adjustment unit (90) may further include the first transmission member (95) which is disposed between the second valve (386) and an end portion at the first end portion side of the first spring (91), and which transmits a force of the first spring (91) to the second valve, the first spring applying a force in a closing direction to the second valve (386).

The second damping force generating portion (660) may include the first support member (488) which is disposed inside the first transmission member (95) and supports a surface at the second end portion side of the first valve (686), and the second spring (463) which is supported by the first support member at the first end portion side and applies a force in a closing direction to the first valve.

The adjustment unit (90) may include the contact member (99) which is disposed inside the rod (81) and comes into contact with a second transmission member (97) which transmits a force to a spring receiver which supports an end portion at the second end portion side of the first spring (91), and the operation portion (185) which can change a position of the contact member by a rotation operation.

According to another aspect of the present disclosure, there is provided a saddle-type vehicle (10). The saddle-type vehicle (10) includes a vehicle body (104), a front wheel (105) disposed at a front side of the vehicle body in a traveling direction, a rear wheel (106) disposed at a rear side in the traveling direction, a first shock absorber (1, 2, 3, 4, 5, 6) disposed between the vehicle body and the front wheel, and a second shock absorber (8) disposed between the vehicle body and the rear wheel. At least the first shock absorber is any one of the shock absorber (1, 2, 3, 4, 5, 6) described above.

Advantageous Effects of Invention

According to the present invention, it is possible to provide a shock absorber or the like which can adjust a damping force over a large moving speed range of a piston.

DETAILED DESCRIPTION OF THE INVENTION

Hereinafter, embodiments will be described in detail with reference to the accompanying drawings. The present invention is not limited to the following embodiments.

First Embodiment

Figure 1:
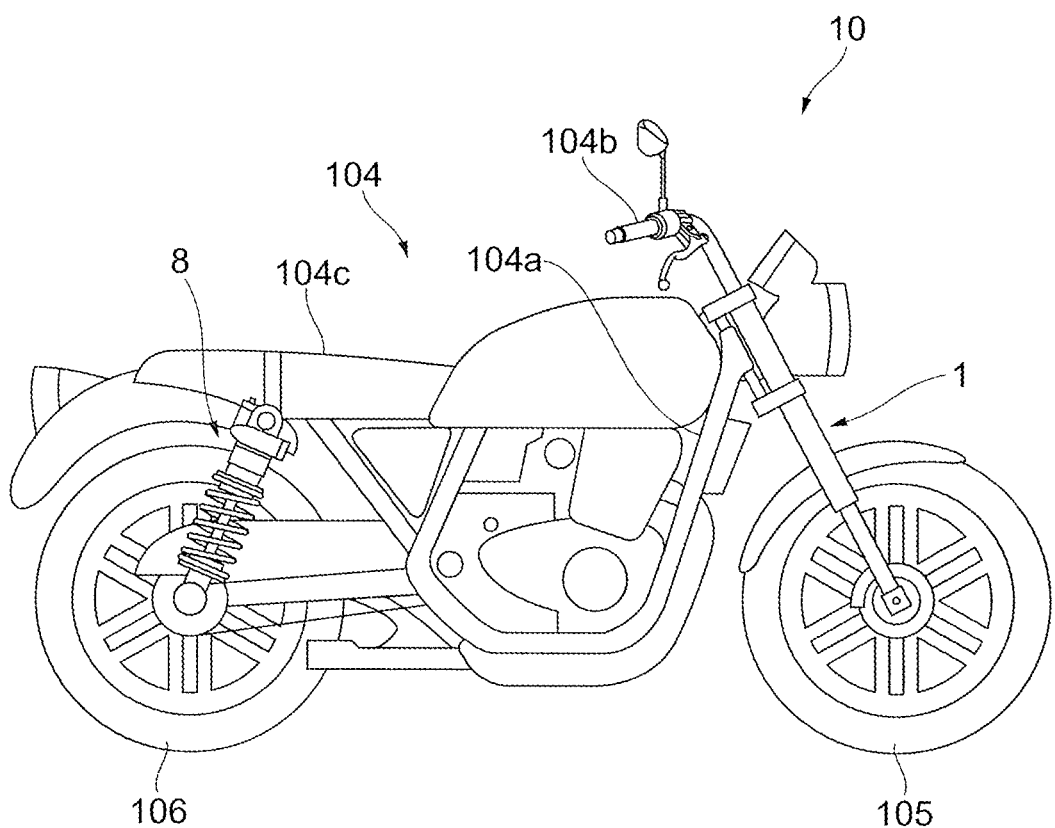
FIG. 1 is a diagram illustrating an example of a schematic configuration of a saddle-type vehicle 10.

FIG. 1 is a diagram illustrating an example of a schematic configuration of a saddle-type vehicle 10.

The saddle-type vehicle 10 includes a vehicle body 104, a front wheel 105 disposed at a front side of the vehicle body 104 in a traveling direction, and a rear wheel 106 disposed at a rear side of the vehicle body 104 in the traveling direction. The vehicle body 104 includes a vehicle body frame 104*a*, a handle 104*b*, and a seat 104*c* which form a framework of the saddle-type vehicle 10.

The saddle-type vehicle 10 includes a first shock absorber 1 disposed between the vehicle body 104 and the front wheel 105, and a second shock absorber 8 disposed between the vehicle body 104 and the rear wheel 106. In the following description, the first shock absorber 1 may be simply referred to as a "shock absorber 1".

Figure 2:
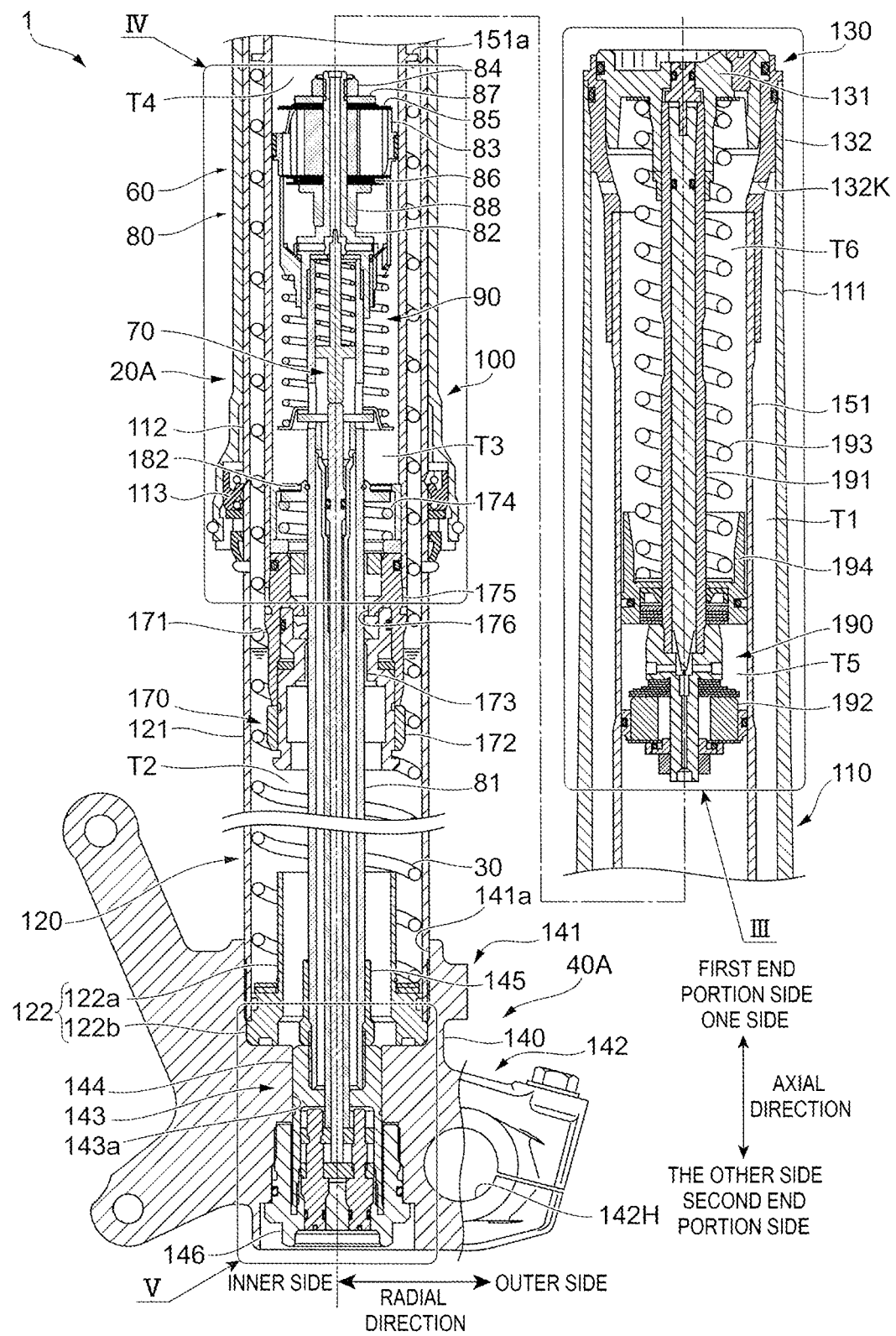
FIG. 2 is a cross-sectional view illustrating an example of a schematic configuration of a shock absorber 1 according to a first embodiment.

FIG. 2 is a cross-sectional view illustrating an example of a schematic configuration of the shock absorber 1 according to a first embodiment.

Figure 3:
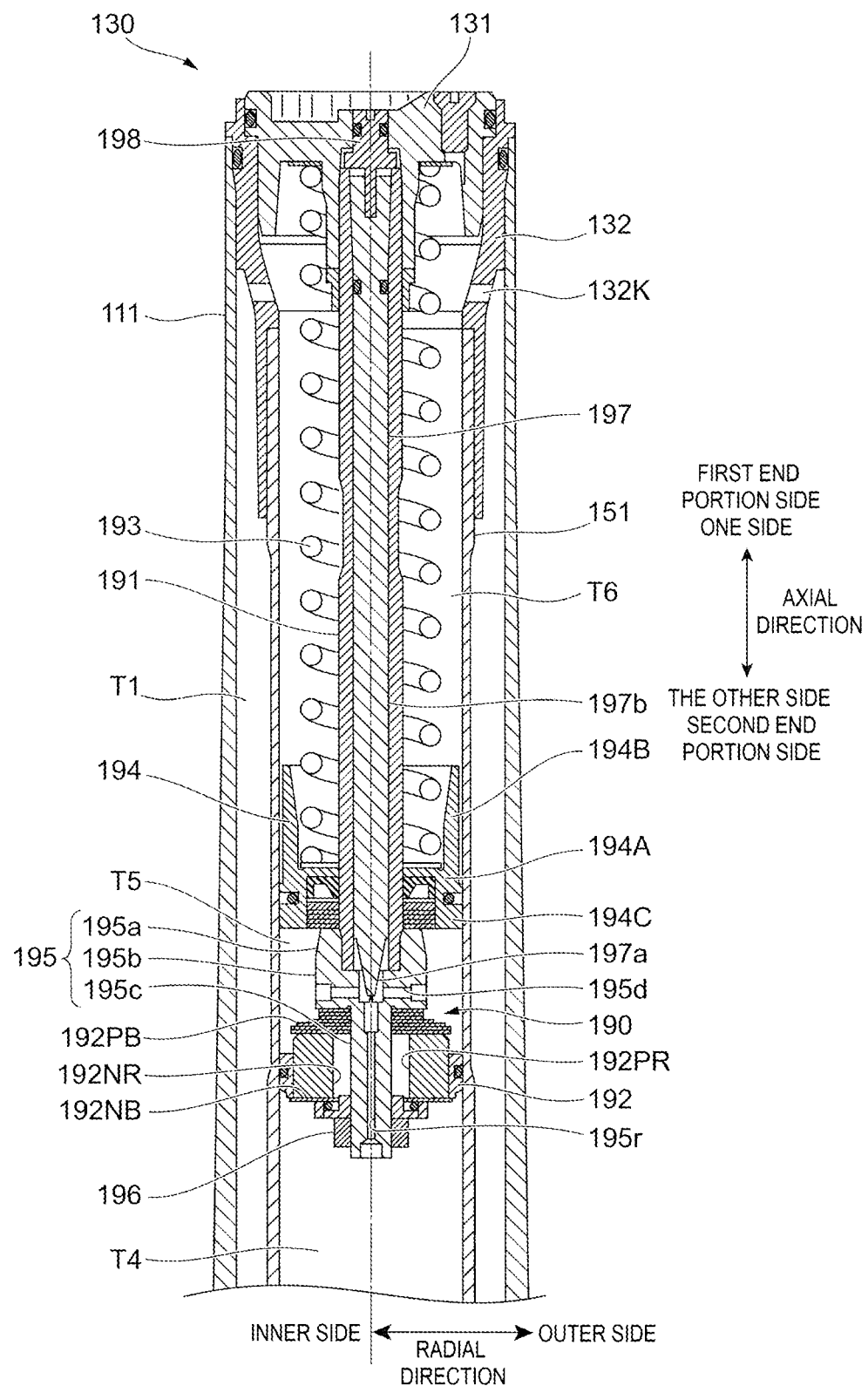
FIG. 3 is an enlarged view illustrating a portion III in FIG. 2.

FIG. 3 is an enlarged view illustrating a portion III in FIG. 2.

Figure 4:
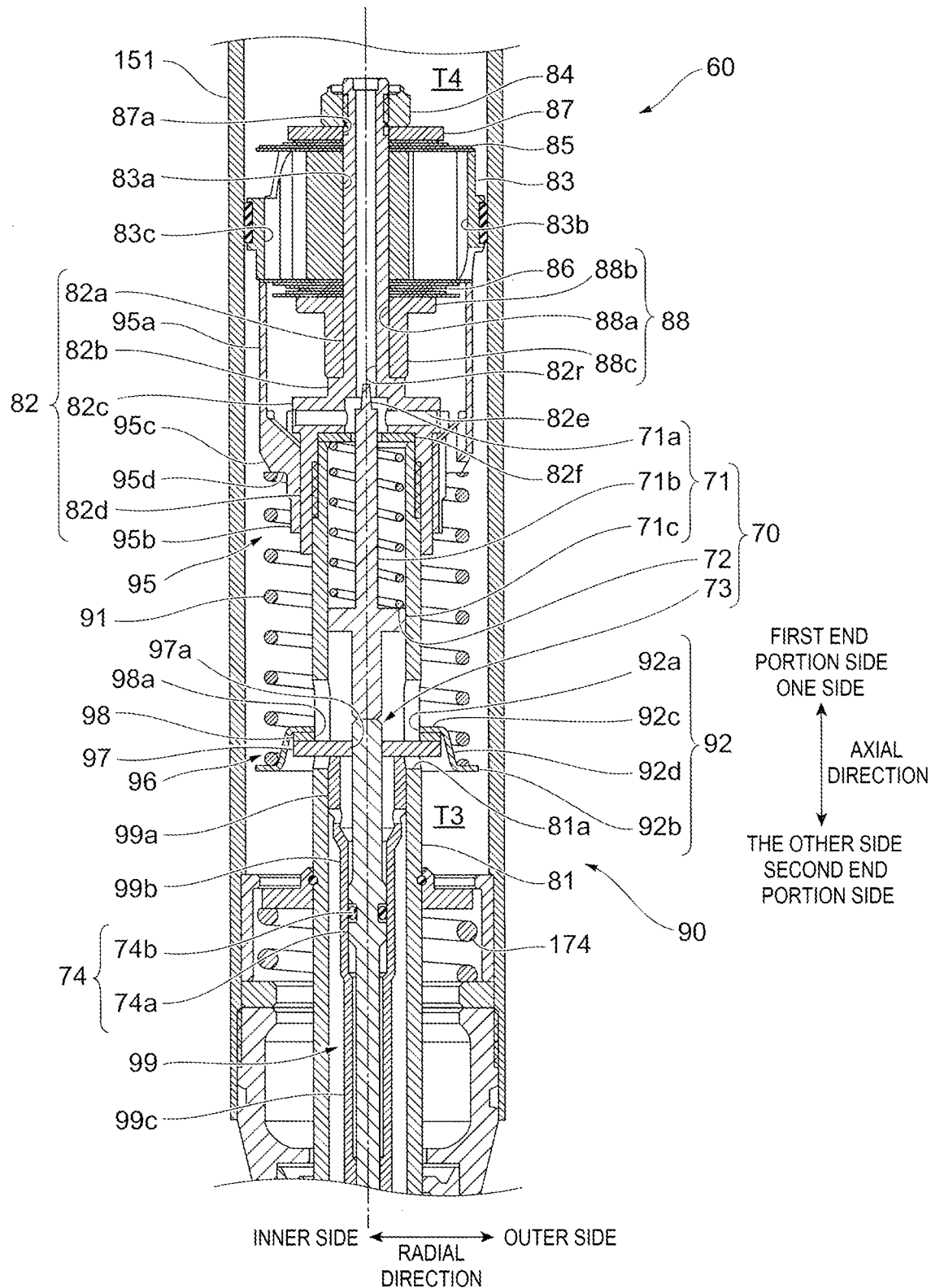
FIG. 4 is an enlarged view illustrating a portion IV in FIG. 2.

FIG. 4 is an enlarged view illustrating a portion IV in FIG. 2.

Figure 5:
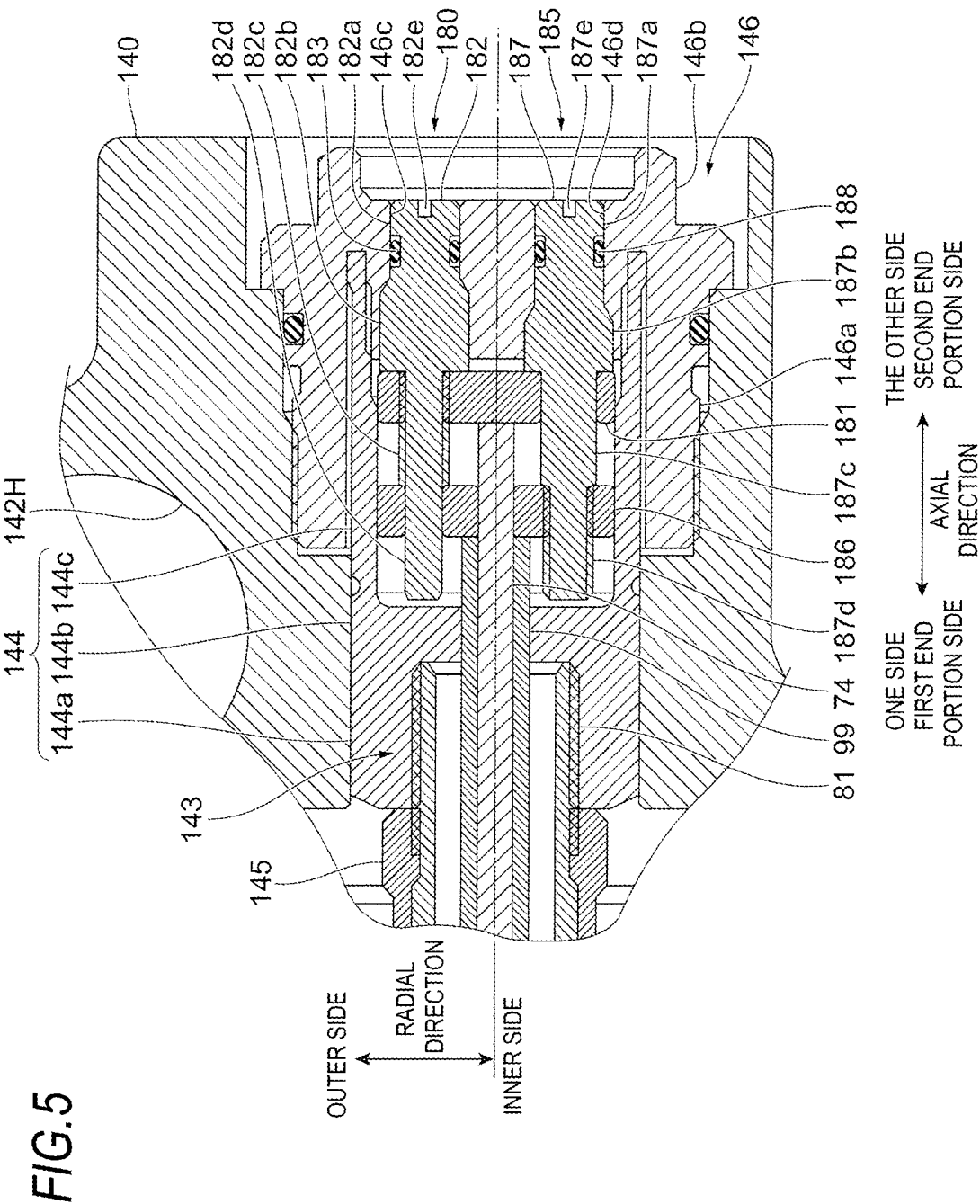
FIG. 5 is an enlarged view illustrating a portion V in FIG. 2.

FIG. 5 is an enlarged view illustrating a portion V in FIG. 2.

Figure 6:
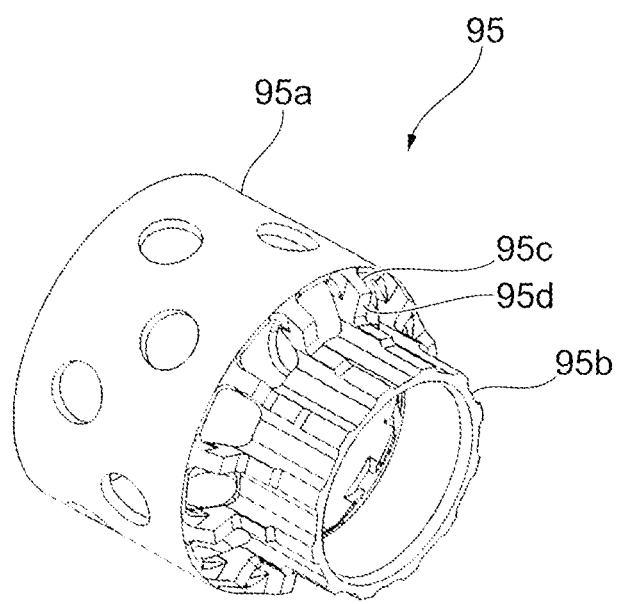
FIG. 6 is a perspective view illustrating an example of a first transmission member 95.

FIG. 6 is a perspective view illustrating an example of a first transmission member 95.

The shock absorber 1 according to the first embodiment is an inverted front fork provided between a front wheel and a handle provided on a vehicle body of a saddle-type vehicle such as a motorcycle, and the shock absorber 1 is a device which buffers an impact or vibration input from a front wheel and transmits steering of the handle to the front wheel.

The shock absorber 1 includes an outer cylinder portion 20A and an axle bracket portion 40A. The outer cylinder portion 20A and the axle bracket portion 40A may be the same as the outer cylinder portion 20A and the axle bracket portion 40A disclosed in JP-A-2017-172739. The shock absorber 1 further includes a coil spring 30 which absorbs an impact input from the front wheel, and a damper portion 100 corresponding to a damper portion provided in a first front fork disclosed in JP-A-2017-172739.

Hereinafter, the damper portion 100 will be described in detail. In the following description, members and portions of the shock absorber 1 which have the same shape and function as the first front fork disclosed in JP-A-2017-172739 are denoted by the same reference numerals, and detailed description thereof will be omitted.

(Outer Cylinder Portion 20A)

The outer cylinder portion 20A includes an outer tube portion 110, an inner tube portion 120, and a fork bolt portion 130.

The outer tube portion 110 includes an outer tube 111, a bush 112, and a seal member 113.

The inner tube portion 120 includes an inner tube 121 and a bottom piece 122.

The outer tube 111 is positioned at a vehicle body side, and the inner tube 121 is positioned at a front wheel side.

The outer tube 111 is disposed coaxially with the inner tube 121 and is disposed outside the inner tube 121 in a radial direction.

In the following description, a center line direction of the outer tube 111 may be referred to as an "axial direction". Relative to the axial direction, an upper side in FIG. 2 which is a first end portion side corresponding to an upper end may be referred to as one side, and a lower side in FIG. 2 which is a second end portion side corresponding to a lower end may be referred to as the other side. Further, an inner side in a radial direction from a center line of the outer tube 111 may be referred to as an "inner side" and an outer side in the radial direction from the center line of the outer tube 111 may be referred to as an "outer side".

The bottom piece 122 has a cylindrical first portion 122a and a cylindrical second portion 122b provided at the other side of the first portion 122a. An outer diameter of the first portion 122a is smaller than an inner diameter of the coil spring 30. The first portion 122a is disposed inside the coil spring 30 and guides the coil spring 30 to extend and contract. The second portion 122b is interposed between a bracket 140 of the axle bracket portion 40A and the inner tube 121 in the axial direction. The bracket 140 will be described later. An end portion at the one side of the second portion 122b supports an end portion at the other side of the coil spring 30 via a washer.

The fork bolt portion 130 includes a fork bolt 131 and a cylinder holding portion 132. The fork bolt 131 closes an end portion side at the one side of the cylinder holding portion 132. The cylinder holding portion 132 has a cylindrical shape and is inserted into an inner circumference of the outer tube 111. The cylinder holding portion 132 is formed with a through hole 132K which passes through the cylinder holding portion 132 in the radial direction.

(Axle Bracket Portion 40A)

The axle bracket portion 40A includes the bracket 140 which is provided with a tube holding portion 141, an axle coupling portion 142, and a rod holding portion 143.

The tube holding portion 141 is formed at the bracket 140 and is provided with a recessed portion 141a in the axial direction. An end portion at the other side of the inner tube 121 is inserted into the recessed portion 141a. The recessed portion 141a is formed with a female screw which is tightened to a male screw formed at the end portion at the other side of the inner tube 121.

The axle coupling portion 142 is formed at the bracket 140 and is provided with an axle hole 142H in a direction orthogonal to the axial direction. An axle of the front wheel is inserted into the axle hole 142H. The axle coupling portion 142 holds the axle by tightening the axle of the front wheel inserted into the axle hole 142H with a bolt.

The rod holding portion 143 is provided with a holding nut 144 and a locking nut 145. The holding nut 144 holds a rod member 81 to be described later in an axial through hole 143a which is formed at the bracket 140 and allows an inner side of the recessed portion 141a and an outer side of the rod holding portion 143 to communicate with each other.

The holding nut 144 has a first portion 144a, a second portion 144b, and a third portion 144c in this order from the one side to the other side. The first portion 144a, the second portion 144b, and the third portion 144c are three cylindrical portions having different inner diameters. An inner circumferential surface of the first portion 144a is formed with a female screw which engages with a male screw formed at an end portion at the other side of the rod member 81. The rod member 81 is tightened to the first portion 144a and then is fixed to the holding nut 144 by the locking nut 145. An inner diameter of the second portion 144b is smaller than an inner diameter of the first portion 144a, and an end surface at the one side of the second portion 144b prevents the rod member 81 from moving to the other side. A first adjusting nut 181, a second adjusting nut 186, and the like which will be described later are accommodated in the third portion 144c.

The axle bracket portion 40A includes a closing member 146 which closes an opening portion at the other side of the third portion 144c of the holding nut 144. The closing member 146 includes a cylindrical first portion 146a and a disk-shaped second portion 146b provided at the other side of the first portion 146a. An end portion at the one side of the first portion 146a is formed with a male screw which engages with a female screw formed at the bracket 140. The first portion 146a has a seal ring fitted into a groove recessed from an outer circumferential surface of the first portion 146a, and the seal ring seals a gap between the first portion 146a and an inner circumferential surface of the bracket 140. The second portion 146b is formed with a through hole 146c through which a first adjuster 182 passes and an axial through hole 146d through which a second adjuster 187 passes.

(Damper Portion 100)

The damper portion 100 includes a cylinder 151, a sub valve device 190 mounted to an end portion at the one side of the cylinder 151, and a main valve device 60 disposed to be movable in the cylinder 151 in the axial direction.

The cylinder 151 is a cylindrical member and is disposed inside the outer tube 111 and the inner tube 121. The cylinder 151 is inserted into an inner circumference of the cylinder holding portion 132, and the cylinder holding portion 132 holds the cylinder 151 by tightening the cylinder 151 with a female screw formed at the cylinder holding portion 132.

A gas chamber T1 filled with air and an oil chamber T2 filled with oil are provided between the outer tube 111 and the cylinder 151 and between the inner tube 121 and the cylinder 151. The air in the gas chamber T1 and the oil in the oil chamber T2 comes into contact with each other via a free interface.

The cylinder 151 is provided with a support member 151a at an outer side, and the support member 151a supports an end portion at the one side of the coil spring 30.

[Sub Valve Device 190]

The sub valve device 190 includes a rod member 191, a sub bolt 195 mounted to an end portion at the other side of the rod member 191, and a piston 192 mounted to an end portion at the other side of the sub bolt 195. The sub valve device 190 includes a pressurizing spring 193, a free piston 194, and a nut 196.

The rod member 191 is a cylindrical member extending along the axial direction. An end portion at the one side of the rod member 191 is tightened to the fork bolt 131 in a state in which the end portion at the one side of the rod member 191 is inserted into an inner circumference of the fork bolt 131.

The sub bolt 195 has a first portion 195a, a second portion 195b, and a third portion 195c in this order from the one side to the other side. The first portion 195a, the second portion 195b, and the third portion 195c are three cylindrical portions having different inner diameters and outer diameters.

An inner circumferential surface of the first portion 195a is formed with a female screw which engages with a male screw formed at an end portion at the other side of the rod member 191.

An inner diameter of the second portion 195b is smaller than an inner diameter of the first portion 195a, and prevents the rod member 191 from moving to the other side. A plurality of through holes 195d which pass through the second portion 195b in the radial direction are formed in the second portion 195b in the circumferential direction.

An inner diameter of the third portion 195c is smaller than an inner diameter of the second portion 195b. An end portion at the other side of the third portion 195c is formed with a male screw which engages with a female screw formed at the nut 196.

The piston 192 is held at an end portion at the other side of the rod member 191, and the piston 192 partitions an oil chamber T4 and an oil chamber T5.

The piston 192 is provided with a flow path 192PR and a flow path 192NR which allow the oil chamber T4 and the oil chamber T5 to communicate with each other. The piston 192 is provided with a valve 192PB which opens and closes the flow path 192PR, and a valve 192NB which opens and closes the flow path 192NR.

The piston 192 is interposed between the second portion 195b and the nut 196 by tightening the nut 196 to a male screw formed at an end portion at the other side of the sub bolt 195. An internal flow path 195r is formed inside the through holes 195d, and oil flows in the internal flow path 195r between the oil chamber T4 and the oil chamber T5 inside the second portion 195b and the third portion 195c.

The pressurizing spring 193 is a coil spring which applies a spring force to the free piston 194 toward the piston 192.

The free piston 194 includes a bottom portion 194A, a tubular portion 194B, and an outer circumferential skirt portion 194C. The free piston 194 slides on an inner diameter portion of the cylinder 151 in a liquid-tight manner. Accordingly, the free piston 194 partitions the oil chamber T5 which communicates with the oil chamber T4 at the piston 192 side and a gas chamber (volume compensation chamber) T6 behind the free piston 194.

The sub valve device 190 includes an adjustment member 197 which adjusts a flow path area of the internal flow path 195r, and an adjuster 198 which is operated to adjust a position of the adjustment member 197.

The adjustment member 197 includes a tip end portion 197a which has a conical shape and is provided at an end portion at the other side of the adjustment member 197, and a columnar portion 197b which has a columnar shape and is provided at the one side relative to the tip end portion 197a. The adjustment member 197 is disposed in a manner in which the columnar portion 197b is disposed inside the hollow rod member 191, and an end portion at the other side of the tip end portion 197a is exposed from an end surface at the other side of the rod member 191. The adjustment member 197 is provided with a seal ring that is fitted into a groove recessed from an outer circumferential surface of the columnar portion 197b, and the seal ring seals a gap between the outer circumferential surface of the columnar portion 197b and an inner circumferential surface of the rod member 191. An end portion at the other side of the tip end portion 197a is inserted into the second portion 195b, and a gap between an outer circumferential surface of the tip end portion 197a and an inner circumferential surface of the third portion 195c serves as a throttle in the internal flow path 195r.

The adjuster 198 is inserted into the fork bolt 131, and a male screw formed at an end portion at the other side of the adjuster 198 is tightened to a female screw formed at an end portion at the one side of the columnar portion 197b. When the adjuster 198 is rotated from an outer side of the fork bolt 131, the adjustment member 197 moves in the axial direction. For example, in a case where screws which engage the adjuster 198 with the adjustment member 197 are left-handed screws, when the adjuster 198 is rotated clockwise, the adjustment member 197 moves to the other side. Then, the tip end portion 197a of the adjustment member 197 moves to the other side, a gap between an outer circumferential surface of the tip end portion 197a and an inner circumferential surface of the third portion 195c is narrowed, and the throttle in the internal flow path 195r is increased. On the other hand, when the adjuster 198 is rotated counterclockwise, the adjustment member 197 moves to the one side. Then, the tip end portion 197a moves to the one side, and the throttle in the internal flow path 195r is reduced.

[Main Valve Device 60]

The main valve device 60 includes a lower cylinder portion 170 and a rod portion 80.

The lower cylinder portion 170 is the same as the lower cylinder portion 170 disclosed in JP-A-2017-172739. As illustrated in FIG. 2, the lower cylinder portion 170 includes a rod guide 171, an oil lock collar 172, a bush 173, a rebound spring 174, and a spring receiver 175.

The rod guide 171 is positioned at an end portion at the other side of the cylinder 151, and is fixed to an end portion of the cylinder 151. The rod guide 171 is provided in a manner in which the rod member 81 to be described later passes through a through hole 176, and supports the rod member 81 so that the rod member 81 can slide in the axial direction.

The rod guide 171 partitions the oil chamber T2 and the oil chamber T3.

Hereinafter, the rod portion 80 will be described in detail.

The rod portion 80 includes the rod member 81, a main bolt 82 mounted to an end portion at the one side of the rod member 81, a piston 83 mounted to an end portion at the one side of the main bolt 82, and a nut 84 tightened to the main bolt 82. The rod portion 80 further includes a valve 85 which generates a damping force at an extension side, a first valve 86 which generates a damping force at a compression side, a support member 87 which supports an end surface at the one side of the valve 85, and a support member 88 which supports an end surface at the other side of the first valve 86. The rod portion 80 further includes a first adjustment unit 70 which adjusts a flow path area of an internal flow path 82r which will be described later and is formed in the main bolt 82, and a second adjustment unit 90 which adjusts a force required to open the first valve 86.

The rod member 81 is a cylindrical member which is fixed to the axle bracket portion 40A and extends along the axial direction. An end portion at the other side of the rod member 81 is formed with a male screw which engages with female screws formed at the holding nut 144 and the locking nut 145 of the axle bracket portion 40A. Radial communication holes 81a which allow an inner side and an outer side of the rod member 81 to communicate with each other are formed in the rod member 81 at every 180 degrees in the circumferential direction.

The main bolt 82 is provided with a first portion 82a, a second portion 82b, a third portion 82c, and a fourth portion 82d in this order from the one side to the other side. The first portion 82a, the second portion 82b, the third portion 82c, and the fourth portion 82d are four cylindrical portions having different inner diameters and outer diameters.

An end portion at the one side of the first portion 82a is formed with a male screw which engages with a female screw formed at the nut 84.

An inner diameter of the second portion 82b is the same as an inner diameter of the first portion 82a, and an outer diameter of the second portion 82b is larger than an outer diameter of the first portion 82a.

An inner diameter of the third portion 82c is larger than an inner diameter of the second portion 82b and is smaller than an outer diameter of the second portion 82b. An outer diameter of the third portion 82c is larger than an outer diameter of the second portion 82b. A plurality of through holes 82e which pass through the third portion 82c in the radial direction are formed in the third portion 82c in the circumferential direction.

An inner diameter of the fourth portion 82d is larger than an inner diameter of the third portion 82c and is smaller than an outer diameter of the third portion 82c. An outer diameter of the fourth portion 82d is smaller than an outer diameter of the third portion 82c. An inner circumferential surface of the fourth portion 82d is formed with a male screw which engages with a female screw formed at an end portion at the one side of the rod member 81.

The main bolt 82 is mounted to the rod member 81 by being tightened to the end portion at the one side of the rod member 81 via a washer 82f. The main bolt 82 is provided with the internal flow path 82r which allows the oil chamber T3 and the oil chamber T4 to communicate with each other through an inner side of the first portion 82a, an inner side of the second portion 82b, and the through holes 82e of the third portion 82c.

The piston 83 is formed with a central hole 83a in a central portion of the piston 83, and the first portion 82a of the main bolt 82 passes through the central hole 83e. The piston 83 is provided with a flow path 83b at a position outside the central hole 83a. The flow path 83b is formed with a through hole which passes through the piston 83 in the axial direction and is formed, from an end portion at the other side of the through hole, with a through hole which passes through the piston 83 in the radial direction. The piston 83 is provided with a first flow path 83c at a position outside the central hole 83a. The first flow path 83c is formed with a through hole which passes through the piston 83 in the axial direction and is formed, from an end portion at the one side of the through hole, with a through hole which passes through the piston 83 in the radial direction.

The valve 85 is formed by stacking a plurality of disk valves, is disposed on an end surface at the one side of the piston 83, and closes an opening portion at the one side of the flow path 83b.

The first valve 86 is formed by stacking a plurality of disk valves, is disposed on an end surface at the other side of the piston 83, and closes an opening portion at the other side of the first flow path 83c. An outer diameter of each disk valve is set as follows. That is, an outer diameter of a disk valve disposed closest to the one side is the largest, an outer diameter of a disk valve disposed in a central portion in a stacking direction is the smallest, and outer diameters are gradually reduced from the one side toward the central portion in the stacking direction. Outer diameters of the disk valves are gradually increased from the central portion in the stacking direction toward the other side.

The support member 87 is an annular member in which a central hole 87a is formed in a central portion of the support member 87. A diameter of the central hole 87a is larger than an outer diameter of the first portion 82a of the main bolt 82. The support member 87 is disposed to surround the main bolt 82 at the one side of the valve 85.

The support member 88 includes a central hole 88a formed in a central portion of the support member 88, a base portion 88b having an annular shape, and a tubular portion 88c having a cylindrical shape. A diameter of the central hole 88a is larger than an outer diameter of the first portion 82a of the main bolt 82 and is smaller than an outer diameter of the second portion 82b. An outer diameter of the base portion 88b is equal to or smaller than an outer diameter of an end surface at the other side of the first valve 86. An outer diameter of the tubular portion 88c is equal to or larger than an outer diameter of the second portion 82b of the main bolt 82 and is smaller than the outer diameter of the base portion 88b. The support member 88 is disposed to surround the circumference of the main bolt 82 at the other side of the first valve 86.

The support member 87, the valve 85, the piston 83, the first valve 86, and the support member 88 are interposed between the second portion 82b of the main bolt 82 and the nut 84 in a state in which the support member 87, the valve 85, the piston 83, the first valve 86, and the support member 88 are in contact with members adjacent to one another.

[First Adjustment Unit 70]

The first adjustment unit 70 includes an adjustment member 71 which adjusts a flow path area of the internal flow path 82r of the main bolt 82, a spring 72 which is a coil spring applying a force to the adjustment member 71 in a direction in which the adjustment member 71 moves to the other side, and an adjustment portion 73 which adjusts a position of the adjustment member 71.

The adjustment member 71 includes a tip end portion 71a which has a conical shape and is provided at an end portion at the one side of the adjustment member 71, and a columnar portion 71b which has a columnar shape and is provided at the other side relative to the tip end portion 71a. A protruding portion 71c is provided at a central portion in the axial direction of the columnar portion 71b, and the protruding portion 71c protrudes from an outer circumferential surface of the columnar portion 71b over the entire circumference and supports an end portion at the other side of the spring 72. An end portion at the one side of the tip end portion 71a of the adjustment member 71 is inserted into the second portion 82b of the main bolt 82. A gap between an outer circumferential surface of the tip end portion 71a and an inner circumferential surface of the second portion 82b serves as a throttle in the internal flow path 82r.

The spring 72 is disposed inside the rod member 81 in the radial direction to surround the columnar portion 71b of the adjustment member 71, and is disposed between the protruding portion 71c of the adjustment member 71 and the washer 82f in the axial direction.

The adjustment portion 73 includes an application member 74 which applies a force to the adjustment member 71 in a direction in which the adjustment member 71 moves to one side, and a first operation portion 180 which can change a position of the adjustment member 71 by a rotation operation.

The application member 74 is a columnar member, and is provided with a protruding portion 74a which protrudes from an outer circumferential surface of the application member 74 over the entire circumference. The application member 74 is provided with a seal ring 74b fitted into a groove recessed from the outer circumferential surface of the protruding portion 74a.

[Second Adjustment Unit 90]

The second adjustment unit 90 includes a first spring 91 which is a coil spring applying a force in a closing direction to the first valve 86, and a spring receiver 92 which supports an end portion at the other side of the first spring 91. The second adjustment unit 90 includes a first transmission member 95 which supports one end portion at the one side of the first spring 91 and transmits a spring force of the first spring 91 to the first valve 86, and a second adjustment portion 96 which adjusts a position of the spring receiver 92.

The spring receiver 92 is a member in which a central hole 92a is formed in a central portion of the spring receiver 92. A diameter of the central hole 92a is larger than an outer diameter of the rod member 81, and the spring receiver 92 is disposed to surround the rod member 81.

The spring receiver 92 includes a support portion 92b which supports an end portion at the other side of the first spring 91, a receiving portion 92c which receives a force transmitted via a second transmission member 97 to be described later, and a connection portion 92d which connects the support portion 92b and the receiving portion 92c.

The support portion 92b is an annular portion. A surface at the one side of the support portion 92b is formed to such a shape in which an inner diameter of the surface is smaller than an inner diameter of the first spring 91 and an outer diameter of the surface is larger than an outer diameter of the first spring 91. The surface at the one side of the support portion 92b is in contact with the first spring 91.

The receiving portion 92c is an annular portion provided inward of the support portion 92b and provided at the one side.

The connection portion 92d is a cylindrical portion having an inner diameter and an outer diameter which gradually increase from the one side toward the other side. The connection portion 92d prevents a radial movement of the first spring 91 disposed to surround the connection portion 92d, and prevents a radial movement of the second transmission member 97 disposed inside the connection portion 92d.

The first transmission member 95 includes a cylindrical first portion 95a, a cylindrical second portion 95b which is provided on inward of the first portion 95a and provided at the other side of the first portion 95a, and a connection portion 95c which connects the first portion 95a and the second portion 95b.

An end portion at the one side of the first portion 95a is in contact with an outermost diameter portion of the first valve 86, and applies a spring force of the first spring 91 to the first valve 86. A plurality of radial through holes are formed in the first portion 95a in the circumferential direction. An inner diameter of the first portion 95a is larger than an outer diameter of the base portion 88b of the support member 88, and the first portion 95a is disposed to surround the support member 88.

An inner diameter of the second portion 95b is equal to or larger than an outer diameter of the fourth portion 82d of the main bolt 82, and is smaller than an outer diameter of the third portion 82c. An outer diameter of the second portion 95b is smaller than an inner diameter of the first spring 91. In the axial direction, the second portion 95b is disposed at the other side of the third portion 82c of the main bolt 82. In the radial direction, the second portion 95b is disposed outward of the fourth portion 82d of the main bolt 82 and inward of the first spring 91.

As illustrated in FIG. 6, a plurality of connection portions 95c are provided in the circumferential direction. The connection portion 95c has an orthogonal surface 95d orthogonal to the axial direction. The orthogonal surface 95d supports an end portion at the one side of the first spring 91.

The second adjustment portion 96 includes a second transmission member 97 which transmits a force to the spring receiver 92, and a washer 98 which is disposed between the second transmission member 97 and the spring receiver 92. The second adjustment portion 96 further includes a contact member 99 which comes into contact with the second transmission member 97, and a second operation portion 185 which can change a position of the spring receiver 92 by a rotation operation.

The second transmission member 97 is an annular member in which a central hole 97a is formed in a central portion of the second transmission member 97. An outer diameter of the second transmission member 97 is larger than an outer diameter of the application member 74. The second transmission member 97 communicates with two communication holes 81a of the rod member 81.

The washer 98 is an annular member in which a central hole 98a is formed in a central portion of the washer 98. A diameter of the central hole 98a is larger than an outer diameter of the rod member 81, and the washer 98 is disposed to surround the rod member 81. The washer 98 is disposed inside the connection portion 92d.

The contact member 99 includes a first portion 99a, a second portion 99b, and a third portion 99c in this order from the one side to the other side. The first portion 99a, the second portion 99b, and the third portion 99c are three cylindrical portions having different inner diameters and outer diameters. The inner diameters of the first portion 99a, the second portion 99b, and the third portion 99c are larger than an outer diameter of the application member 74, and the contact member 99 is disposed inside the rod member 81 to surround the application member 74.

The inner diameter of the second portion 99b is larger than an outer diameter of the protruding portion 74a of the application member 74, and the protruding portion 74a is inserted into the second portion 99b. The seal ring 74b fitted into a groove recessed from the outer circumferential surface of the protruding portion 74a seals the gap between the contact member 99 and the application member 74.

The inner diameter of the third portion 99c is smaller than the outer diameter of the protruding portion 74a of the application member 74, and prevents the protruding portion 74a from moving to the other side.

[First Operation Portion 180 and Second Operation Portion 185]

The first operation portion 180 includes a first adjusting nut 181 which applies a force to the application member 74 in a direction of the one side, a first adjuster 182 which engages with a female screw formed at the first adjusting nut 181 and moves the first adjusting nut 181 in the axial direction, and a seal ring 183 which seals a gap between the first adjuster 182 and the closing member 146.

The second operation portion 185 includes a second adjusting nut 186 which applies a force to the contact member 99 in the direction of the one side, a second adjuster 187 which engages with a female screw formed at the second adjusting nut 186 and moves the second adjusting nut 186 in the axial direction, and a seal ring 188 which seals a gap between the second adjuster 187 and the closing member 146.

The first adjusting nut 181 is formed with a female screw which engages with a male screw of the first adjuster 182, and a through hole through which the second adjuster 187 passes. Then, an end surface at the one side of the first adjusting nut 181 comes into contact with an end face at the other side of the application member 74, and applies a force to the application member 74 in the direction of the one side.

The first adjuster 182 has a plurality of columnar portions which are arranged in the axial direction and have different outer diameters. More specifically, the first adjuster 182 includes a first portion 182a provided at an end portion at the other side, and a second portion 182b which is provided at the one side of the first portion 182a and has an outer diameter larger than an outer diameter of the first portion 182*a*. The first adjuster 182 includes a third portion 182*c* provided at the one side of the second portion 182*b* and having an outer diameter smaller than the outer diameter of the second portion 182*b*, and a fourth portion 182*d* provided at the one side of the third portion 182*c* and having an outer diameter smaller than the outer diameter of the third portion 182*c*.

A seal ring 183 is fitted into a groove recessed from an outer circumferential surface of the first portion 182*a*. An end surface at the other side of the first portion 182*a* is formed with a recessed portion 182*e* which is recessed from the end surface to the one side.

An outer diameter of the second portion 182*b* is larger than a hole diameter of a female screw formed at the first adjusting nut 181.

An outer circumferential surface of the third portion 182*c* is formed with a male screw which engages with the female screw formed at the first adjusting nut 181.

The fourth portion 182*d* passes through a through hole formed in the second adjusting nut 186.

The second adjusting nut 186 is formed with a female screw which engages with a male screw of the second adjuster 187 and a through hole through which the first adjuster 182 passes. An end surface at the one side of the second adjusting nut 186 comes into contact with an end face at the other side of the contact member 99, and applies a force in the direction of the one side to the contact member 99.

The second adjuster 187 has a plurality of columnar portions which are arranged in the axial direction and have different outer diameters. More specifically, the second adjuster 187 includes a first portion 187*a* provided at an end portion at the other side, and a second portion 187*b* which is provided at the one side of the first portion 187*a* and has an outer diameter larger than an outer diameter of the first portion 187*a*. The second adjuster 187 includes a third portion 187*c* provided at the one side of the second portion 187*b* and having an outer diameter smaller than the outer diameter of the second portion 187*b*, and a fourth portion 187*d* provided at the one side of the third portion 187*c* and having an outer diameter smaller than the outer diameter of the third portion 187*c*.

A seal ring 188 is fitted into a groove recessed from an outer circumferential surface of the first portion 187*a*. An end surface at the other side of the first portion 187*a* is formed with a recessed portion 187*e* which is recessed from the end surface to the one side.

An outer diameter of the second portion 187*b* is larger than the hole diameter of the through hole formed in the first adjusting nut 181.

The third portion 187*c* passes through a through hole formed in the first adjusting nut 181.

The fourth portion 187*d* is formed with a male screw which engages with a female screw formed at the second adjusting nut 186.

[Function of First Adjustment Unit 70]

In the first adjustment unit 70, the first adjuster 182 of the first operation portion 180 is rotated from an outer side of the bracket 140. Then, the through hole of the first adjusting nut 181 and the third portion 187*c* of the second adjuster 187 are fitted to each other, so that the first adjusting nut 181 which engages with the first adjuster 182 is prevented from rotating, and the first adjusting nut 181 moves in the axial direction. Accordingly, the application member 74 moves in the axial direction. For example, in a case where screws which engage the first adjuster 182 with the first adjusting nut 181 are left-handed screws, when the first adjuster 182 is rotated clockwise, the application member 74 moves to the one side. Then, the tip end portion 71*a* of the adjustment member 71 moves to the one side, and a gap between an outer circumferential surface of the tip end portion 71*a* and an inner circumferential surface of the second portion 82*b* of the main bolt 82 is narrowed. As a result, the throttle in the internal flow path 82*r* is increased. On the other hand, when the first adjuster 182 is rotated counterclockwise, the application member 74 moves to the other side. Then, the tip end portion 71*a* of the adjustment member 71 moves to the other side, and the throttle in the internal flow path 82*r* is reduced.

[Function of Second Adjustment Unit 90]

In the second adjustment unit 90, the second adjuster 187 of the second operation portion 185 is rotated from an outer side of the bracket 140. Then, the through hole of the second adjusting nut 186 and the fourth portion 182*d* of the first adjuster 182 are fitted to each other, so that the second adjusting nut 186 which engages with the second adjuster 187 is prevented from rotating, and the second adjusting nut 186 moves in the axial direction. Accordingly, the contact member 99 moves in the axial direction. For example, in a case where screws which engage the second adjuster 187 with the second adjusting nut 186 are left-handed screws, when the second adjuster 187 is rotated clockwise, the contact member 99 moves to the one side. As the contact member 99 moves to the one side, the second transmission member 97 moves to the one side, and the spring receiver 92 moves to the one side. As a result, a length of the first spring 91 is shortened, and a preset load F2 which is a preset load of the first spring 91 is increased. On the other hand, when the second adjuster 187 is rotated counterclockwise, the contact member 99 and the second transmission member 97 move to the other side, and the spring receiver 92 moves to the other side. As a result, the length of the first spring 91 is increased, and the preset load F2 is reduced.

In the damper portion 100 having the above-described configuration, even when a preset load F2 has a minimum value, a pressure at which the first valve 86 is opened is set to be higher than a pressure at which the valve 192PB is opened. For example, when the preset load F2 has the minimum value, the valve 192PB opens the flow path 192PR when a pressure Ps of the oil chamber T4 is equal to or higher than a first pressure P1 determined according to bending rigidity of the valve 192PB. The first valve 86 opens the first flow path 83*c* when the pressure Ps is equal to or higher than a second pressure P2 (>the first pressure P1) determined according to the preset load F2.

[Function of Shock Absorber 1]

<Extension Side Stroke>

In an extension side stroke in which the piston 83 moves to a front wheel side in the cylinder 151 due to an upward and downward movement of the front wheel, the outer tube 111 and the inner tube 121 move in a direction in which the outer tube 111 and the inner tube 121 are relatively separated from each other in the axial direction. At this time, the piston 83 and the lower cylinder portion 170 move in a direction in which the piston 83 and the lower cylinder portion 170 relatively come close to each other in the axial direction. The piston 83 and the piston 192 move in a direction in which the piston 83 and the piston 192 are relatively separated from each other in the axial direction.

As the piston 83 and the lower cylinder portion 170 come close to each other, a volume of the oil chamber T3 is reduced. On the other hand, as the piston 83 and the piston 192 are separated from each other, a volume of the oil chamber T4 is increased. As a result, the oil in the oil chamber T3 passes through the flow path 83b, opens the valve 85, and moves to the oil chamber T4. When the oil push-opens the valve 85 and passes through the valve 85, a damping force is generated.

At this time, the rod member 81 is retracted from the oil chamber T3. Therefore, the oil at an amount corresponding to a volume of the rod member 81 retracted from the oil chamber T3 moves from the oil chamber T5 to the oil chamber T4. In this case, the oil in the oil chamber T5 opens the valve 192NB, passes through the flow path 192NR, and moves to the oil chamber T4. When the oil push-opens the valve 192NB and passes through the valve 192NB, a damping force is generated.

When the oil moves to the oil chamber T4, the free piston 194 moves to the other side in the axial direction. As a result, a volume of the gas chamber T6 is increased. The gas at an amount corresponding to the increased volume of the gas chamber T6 passes through the through hole 132K and moves from the gas chamber T1 to the gas chamber T6.

(Compression Side Stroke)

In a compression side stroke in which the piston 83 moves to a vehicle body side in the cylinder 151, the outer tube 111 and the inner tube 121 move in a direction in which the outer tube 111 and the inner tube 121 relatively come close to each other in the axial direction. At this time, the piston 83 and the lower cylinder portion 170 move in a direction in which the piston 83 and the lower cylinder portion 170 are relatively separated from each other in the axial direction. The piston 83 and the piston 192 move in a direction in which the piston 83 and the piston 192 relatively come close to each other in the axial direction.

As the piston 83 and the lower cylinder portion 170 are separated from each other, the volume of the oil chamber T3 is increased. On the other hand, as the piston 83 and the piston 192 come close to each other, the volume of the oil chamber T4 is reduced. Accordingly, the oil in the oil chamber T4 passes through the internal flow path 82r of the main bolt 82 and moves to the oil chamber T3. When the oil passes through a gap between an outer circumferential surface of the tip end portion 71a of the adjustment member 71 and an inner circumferential surface of the second portion 82b and the gap serves as a throttle of the internal flow path 82r, a damping force is generated. The damping force generated at this time can be adjusted by operating the first adjuster 182.

At this time, the rod member 81 enters the oil chamber T3. Therefore, the oil at an amount corresponding to the volume of the rod member 81 entering the oil chamber T3 moves from the oil chamber T4 to the oil chamber T5. In this case, the oil in the oil chamber T4 passes through the internal flow path 195r of the sub bolt 195 and moves to the oil chamber T5. When the oil passes through a gap between an outer circumferential surface of the tip end portion 197a of the adjustment member 197 and an inner circumferential surface of the third portion 195c and the gap serves as a throttle of the internal flow path 195r, a damping force is generated. The damping force generated at this time can be adjusted by operating the adjuster 198.

When the oil moves to the oil chamber T5, the free piston 194 moves to the one side in the axial direction. As a result, a volume of the gas chamber T6 is reduced. The gas at an amount corresponding to the reduced volume of the gas chamber T6 passes through the through hole 132K and moves from the gas chamber T6 to the gas chamber T1.

When the pressure Ps in the oil chamber T4 is equal to or higher than the first pressure P1, the oil in the oil chamber T4 opens the valve 192PB and moves to the oil chamber T5 through the flow path 192PR. When the oil push-opens the valve 192PB and passes through the valve 192PB, a damping force is generated.

When the pressure Ps in the oil chamber T4 is equal to or higher than the second pressure P2, the oil in the oil chamber T4 opens the first valve 86 and moves to the oil chamber T3 through the first flow path 83c. When the oil push-opens the first valve 86 and passes through the first valve 86, a damping force is generated.

Figure 7:
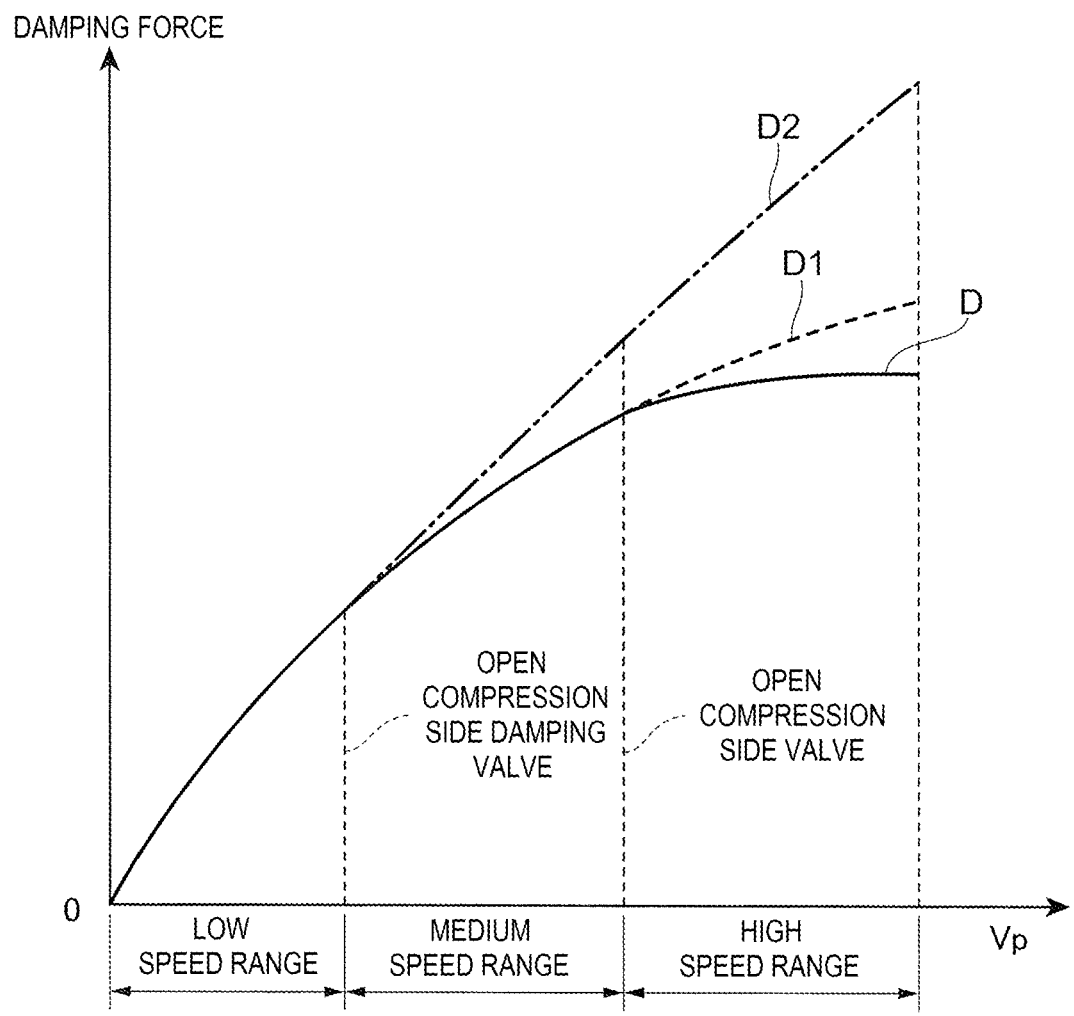
FIG. 7 is a diagram illustrating a relationship between a speed Vp of a piston 83 and a damping force during a compression side stroke.

FIG. 7 is a diagram illustrating a relationship between a speed Vp of the piston 83 and a damping force during a compression side stroke. In FIG. 7, a damping force D of the shock absorber 1 according to the first embodiment is indicated by a solid line. A damping force D1 of a configuration (hereinafter, may be referred to as a "first comparative configuration") in which the first valve 86 is not opened as compared with the shock absorber 1 is indicated by a dashed line. A damping force D2 of a configuration (hereinafter, may be referred to as a "second comparative configuration") in which the valve 192PB and the first valve 86 are not opened as compared with the shock absorber 1 is indicated by a two-dot chain line.

In the second comparative configuration, a damping force corresponding to the speed Vp is generated at throttles of the internal flow path 82r and the internal flow path 195r. Therefore, the damping force D2 is increased as the speed Vp increases in the second comparative configuration.

In the shock absorber 1 and the first comparative configuration, since the valve 192PB is opened, the damping force D and the damping force D1 are smaller than the damping force D2 at a speed equal to or higher than the speed Vp at which the pressure Ps is equal to a pressure at which the valve 192PB is opened.

In the shock absorber 1, since the first valve 86 is opened, the damping force D is smaller than the damping force D1 and the damping force D2 at a speed equal to or higher than the speed Vp at which the pressure Ps is equal to a pressure at which the first valve 86 is opened.

Therefore, according to the shock absorber 1, ride comfort in a high speed range in which the speed Vp is high and the first valve 86 is opened can be improved compared with the ride comfort in the first comparative configuration and the second comparative configuration. According to the shock absorber 1, ride comfort in the medium speed range in which the speed Vp is high, the first valve 86 is not opened, and the valve 192PB is opened can be improved compared with the ride comfort in the second comparative configuration.

Since the shock absorber 1 includes the second adjustment unit 90, the damping force D in the high speed range can be adjusted.

For example, in the second comparative configuration, when the ride comfort in the low speed range and the medium speed range is good but the ride comfort in the high speed range is poor, a size of the throttle of the internal flow path 82r or the internal flow path 195r needs to be changed. In this manner, when the size of the throttle of the internal flow path 82r or the internal flow path 195r is changed, damping characteristics in the low speed range and the medium speed range as well as in the high speed range are changed.

In the first comparative configuration, when the ride comfort in the low speed range and the medium speed range is good but the ride comfort in the high speed range is poor, a size of the throttle of the internal flow path 82r or the internal flow path 195r or specifications of the valve 192PB needs to be changed. In this manner, when the size of the throttle of the internal flow path 82r or the internal flow path 195r or the specifications of the valve 192PB is changed, damping characteristics in the low speed range and the medium speed range as well as in the high speed range are changed.

On the other hand, since the shock absorber 1 includes the main valve device 60, the damping force D in the high speed range can be adjusted independently of an adjustment of the damping force in the low speed range generated corresponding to the throttle of the internal flow path 82r or the internal flow path 195r and an adjustment of the damping force in the medium speed range generated corresponding to the specifications of the valve 192PB. Therefore, according to the shock absorber 1, the damping force can be adjusted over a larger moving speed range of the piston than the first comparative configuration and the second comparative configuration.

Second Embodiment

Figure 8:
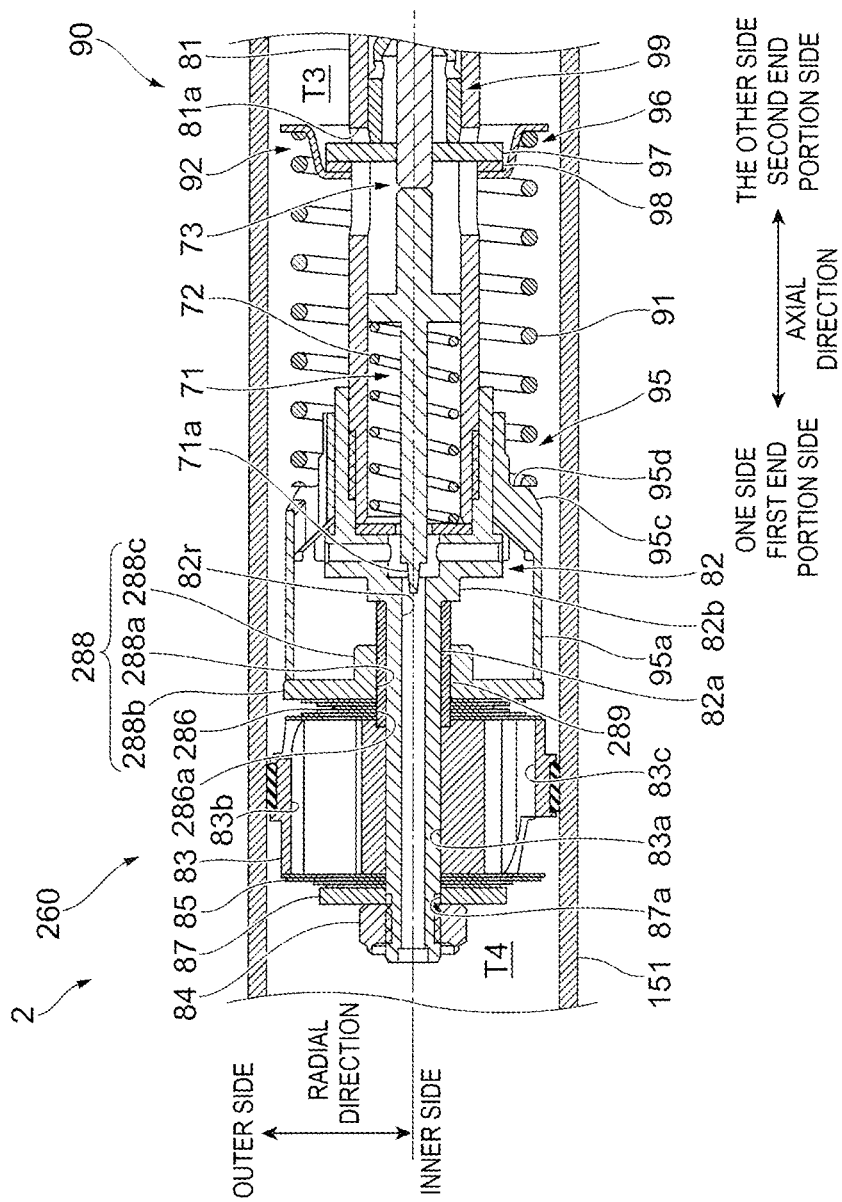
FIG. 8 is a cross-sectional view illustrating an example of a schematic configuration of a shock absorber 2 according to a second embodiment.

FIG. 8 is a cross-sectional view illustrating an example of a schematic configuration of a shock absorber 2 according to a second embodiment.

The shock absorber 2 according to the second embodiment is different from the shock absorber 1 according to the first embodiment in a main valve device 260 corresponding to the main valve device 60.

Hereinafter, differences of the main valve device 260 from the main valve device 60 will be described. Components having the same functions in the main valve device 260 and the main valve device 60 are denoted by the same reference numerals, and detailed description thereof will be omitted.

The main valve device 260 is different from the main valve device 60 in which the main valve device 260 includes a first support member 288 corresponding to the support member 88 of the main valve device 60, and one end portion at the one side of the first transmission member 95 of the second adjustment unit 90 comes into contact with the first support member 288 and transmits a spring force of the first spring 91 to the first support member 288. The main valve device 260 is different from the main valve device 60 in which the main valve device 260 includes a first valve 286 corresponding to the first valve 86 of the main valve device 60 and a cylindrical collar 289 which is interposed between the piston 83 and the second portion 82b of the main bolt 82 inside the first support member 288. The first valve 286 has an inner diameter larger than that of the first valve 86, so that the collar 289 can be disposed inside the first valve 286.

The first support member 288 is provided with a central hole 288a formed in a central portion, a base portion 288b having an annular shape, and a tubular portion 288c having a cylindrical shape. A diameter of the central hole 288a is larger than an outer diameter of the collar 289 and is smaller than an outer diameter of the second portion 82b of the main bolt 82. An outer diameter of the base portion 288b is larger than an outer diameter of the first portion 95a of the first transmission member 95, and an end portion at the one side of the first transmission member 95 comes into contact with an end surface at the other side of the base portion 288b. An outer diameter of the tubular portion 288c is equal to or larger than the outer diameter of the second portion 82b of the main bolt 82, and is smaller than an inner diameter of the first transmission member 95. A size of the first support member 288 in the axial direction is smaller than A size of the collar 289.

In the main valve device 260 having the above-described configuration, the first valve 286 and the first support member 288 slide relative to the collar 289 in accordance with the pressure Ps in the oil chamber T4. More specifically, when the pressure Ps is equal to or higher than a third pressure P3 determined according to bending rigidity of the first valve 286, among a plurality of disk valves of the first valve 286, a disk valve disposed at the one side of a central portion in the axial direction of the first valve 286 is opened. Further, when the pressure Ps is equal to or higher than a fourth pressure P4 (>the third pressure P3) determined according to the preset load F2, the first valve 286 and the first support member 288 move to the other side against the spring force of the first spring 91.

Therefore, according to the shock absorber 2, the third pressure P3 at which the first valve 286 starts to be opened can be changed by changing specifications of the plurality of disk valves constituting the first valve 286. Therefore, according to the shock absorber 2, a damping force can be adjusted over a larger moving speed range of the piston than the first comparative configuration and the second comparative configuration.

Third Embodiment

Figure 9:
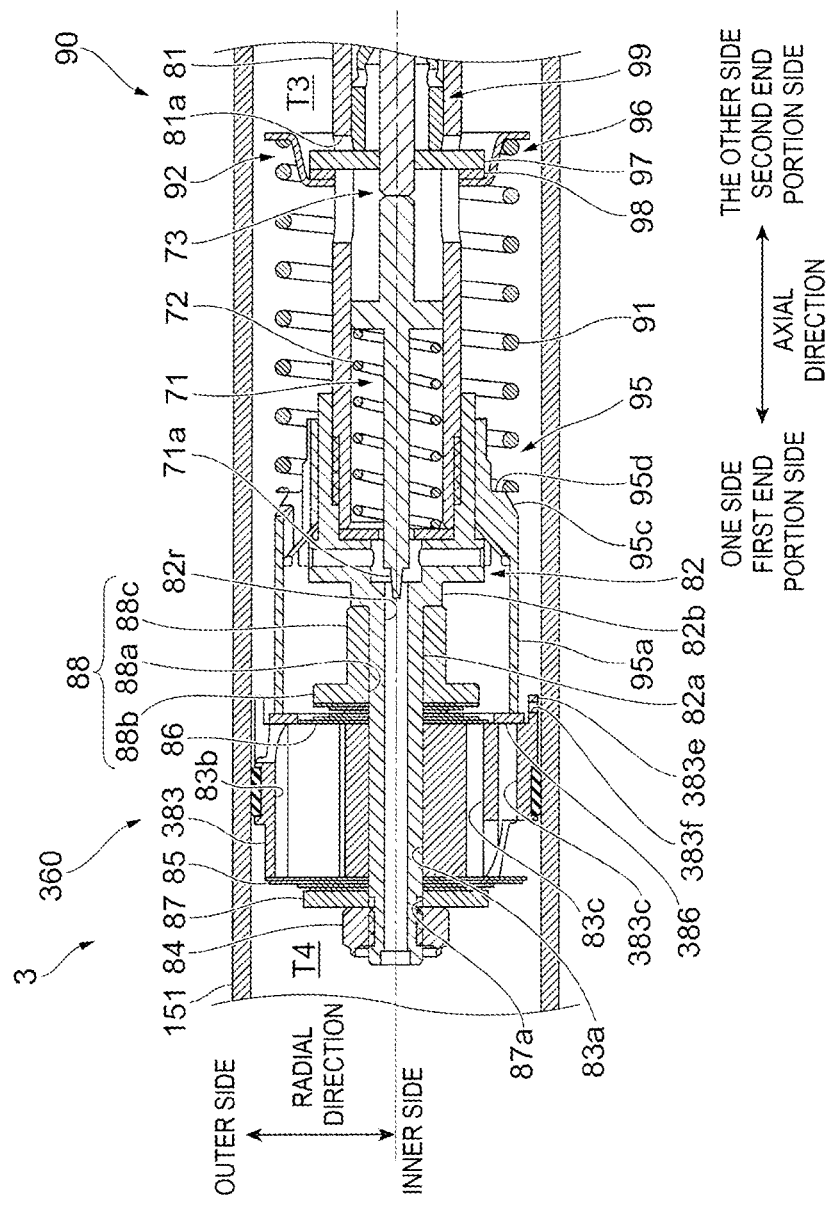
FIG. 9 is a cross-sectional view illustrating an example of a schematic configuration of a shock absorber 3 according to a third embodiment.

FIG. 9 is a cross-sectional view illustrating an example of a schematic configuration of a shock absorber 3 according to a third embodiment.

The shock absorber 3 according to the third embodiment is different from the shock absorber 1 according to the first embodiment in a main valve device 360 corresponding to the main valve device 60.

Hereinafter, differences of the main valve device 360 from the main valve device 60 will be described. Components having the same functions in the main valve device 360 and the main valve device 60 are denoted by the same reference numerals, and detailed description thereof will be omitted.

The main valve device 360 is different from the main valve device 60 in a piston 383 corresponding to the piston 83 of the main valve device 60. In addition to the first flow path 83c, the piston 383 includes a second flow path 383c which passes through the piston 383 in the axial direction of the piston 383 at a position different from the first flow path 83c. The second flow path 383c is formed outward of the first flow path 83c. The piston 383 has an outer wall 383e outward of the second flow path 383c and at an end portion at the other side of the piston 383. The outer wall 383e protrudes to the other side. The outer wall 383e is formed with a through hole 383f which passes through the outer wall 383e in the radial direction.

Further, the main valve device 360 is different from the main valve device 60 in which the main valve device 360 includes a second valve 386 which opens and closes the second flow path 383c. The second valve 386 is, for example, a single disk valve. An inner diameter of the second valve 386 is larger than an outer diameter of the first valve 86, and the second valve 386 is disposed to surround the first valve 86. The second valve 386 is prevented from moving in the radial direction by the outer wall 383e of the piston 383.

In the main valve device 360, an end portion at the one side of the first transmission member 95 of the second adjustment unit 90 comes into contact with the second valve 386, and transmits the spring force of the first spring 91 to the second valve 386.

In the main valve device 360 having the above-described configuration, the first valve 86 and the second valve 386 are opened in accordance with the pressure Ps in the oil chamber T4. More specifically, when the pressure Ps is equal to or higher than a fifth pressure P5 determined according to bending rigidity of the first valve 86, among the plurality of disk valves of the first valve 86, a disk valve disposed at the one side of a central portion in the axial direction of the first valve 286 is opened. Further, when the pressure Ps is equal to or higher than a sixth pressure P6 (>the fifth pressure P5) determined according to the preset load F2, the second valve 386 is opened against the spring force of the first spring 91. When the oil push-opens the second valve 386 and passes through the second valve 386, a damping force is generated. The sixth pressure P6 at which the second valve 386 starts to be opened can be changed by changing the preset load F2 of the first spring 91, and the damping force can be adjusted.

Therefore, according to the shock absorber 3, the fifth pressure P5 at which the first valve 86 starts to be opened can be changed by changing specifications of the plurality of disk valves constituting the first valve 86. In addition, according to the shock absorber 3, the sixth pressure P6 at which the second valve 386 starts to be opened can be changed by changing the preset load F2. Therefore, according to the shock absorber 3, a damping force can be adjusted over a larger moving speed range of the piston than the first comparative configuration and the second comparative configuration.

Fourth Embodiment

Figure 10:
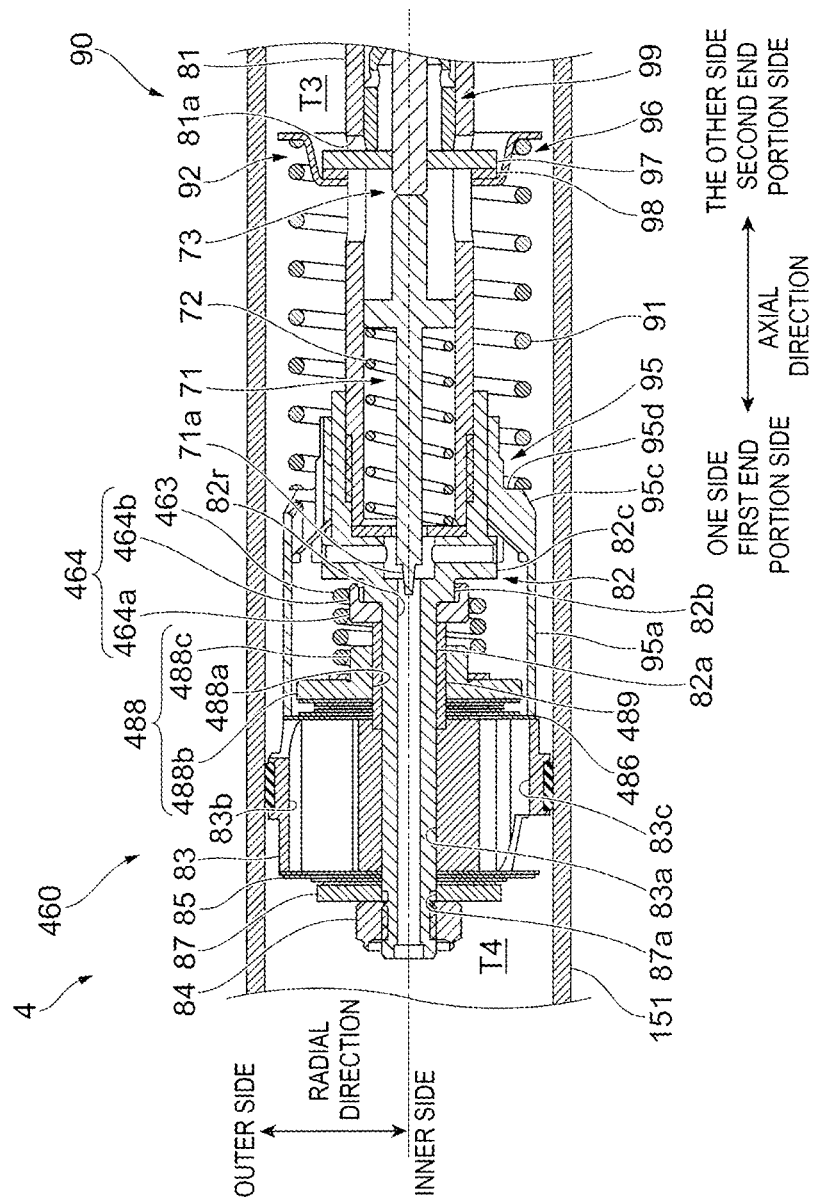
FIG. 10 is a cross-sectional view illustrating an example of a schematic configuration of a shock absorber 4 according to a fourth embodiment.

FIG. 10 is a cross-sectional view illustrating an example of a schematic configuration of a shock absorber 4 according to a fourth embodiment.

The shock absorber 4 according to the fourth embodiment is different from the shock absorber 1 according to the first embodiment in a main valve device 460 corresponding to the main valve device 60.

Hereinafter, differences of the main valve device 460 from the main valve device 60 will be described. Components having the same functions in the main valve device 460 and the main valve device 60 are denoted by the same reference numerals, and detailed description thereof will be omitted.

The main valve device 460 includes a first valve 486 and a first support member 488 respectively corresponding to the first valve 86 and the support member 88 of the main valve device 60. The main valve device 460 includes a second spring 463 which is a coil spring applying a force to the first support member 488 in a direction in which the first valve 486 is closed, and a guide 464 which is disposed inside the second spring 463 and prevents the second spring 463 from moving in the radial direction. The main valve device 460 includes a cylindrical collar 489 interposed between the piston 83 and the guide 464 inside the first valve 486 and the first support member 488. That is, the support member 87, the valve 85, the piston 83, the collar 489, and the guide 464 are interposed between the second portion 82b of the main bolt 82 and the nut 84 in a state in which the support member 87, the valve 85, the piston 83, the collar 489, and the guide 464 are in contact with members adjacent to one another. The first valve 486 has an inner diameter larger than that of the first valve 86, so that the collar 489 can be disposed inside the first valve 486.

The first support member 488 is provided with a central hole 488a formed in a central portion, a base portion 488b having an annular shape, and a tubular portion 488c having a cylindrical shape. A diameter of the central hole 488a is larger than an outer diameter of the collar 489, and an outer diameter of the base portion 488b is smaller than an inner diameter of the first portion 95a of the first transmission member 95. An outer diameter of the tubular portion 488c is smaller than an inner diameter of the second spring 463, and a length in the axial direction of the first support member 488 is smaller than a length in the axial direction of the collar 489.

An end portion at the one side of the second spring 463 is supported by the base portion 488b of the first support member 488 via a washer, and an end portion at the other side of the second spring 463 is supported by the third portion 82c of the main bolt 82.

The guide 464 is provided with a cylindrical first portion 464a and a second portion 464b provided at the other side of the first portion 464a. An inner diameter of the first portion 464a is larger than an outer diameter of the first portion 82a of the main bolt 82 and is smaller than an outer diameter of the collar 489. An inner diameter of the second portion 464b is larger than an outer diameter of the second portion 82b of the main bolt 82 and is smaller than an inner diameter of the second spring 463. The guide 464 is disposed to surround the main bolt 82, and guides the second spring 463 to expand and contract.

In the main valve device 460 having the above-described configuration, in accordance with the pressure Ps in the oil chamber T4, the first valve 486 is opened and the first valve 486 and the first support member 488 slide relative to the collar 489. More specifically, when the pressure Ps is equal to or higher than a seventh pressure P7 determined according to the preset load F2 of the first spring 91 and bending rigidity of the first valve 486, among a plurality of disk valves of the first valve 486, a disk valve disposed at the one side of a central portion in the axial direction of the first valve 286 is opened against a spring force of the first spring 91. Further, when the pressure Ps is equal to or higher than an eighth pressure P8 (>the seventh pressure P7) determined according to a preset load F3 which is a preset load of the second spring 463, the first valve 486 and the first support member 488 move to the other side against a spring force of the second spring 463.

Therefore, according to the shock absorber 4, the seventh pressure P7 at which the first valve 486 starts to be opened can be changed by changing specifications of the plurality of disk valves constituting the first valve 486 or the preset load F2. According to the shock absorber 4, the eighth pressure P8 at which the first valve 486 and the first support member 488 start to move to the other side can be changed by changing the specifications (the preset load F3) of the second spring 463. Therefore, according to the shock absorber 4, a damping force can be adjusted over a larger moving speed range of the piston than the first comparative configuration and the second comparative configuration.

Fifth Embodiment

Figure 11:
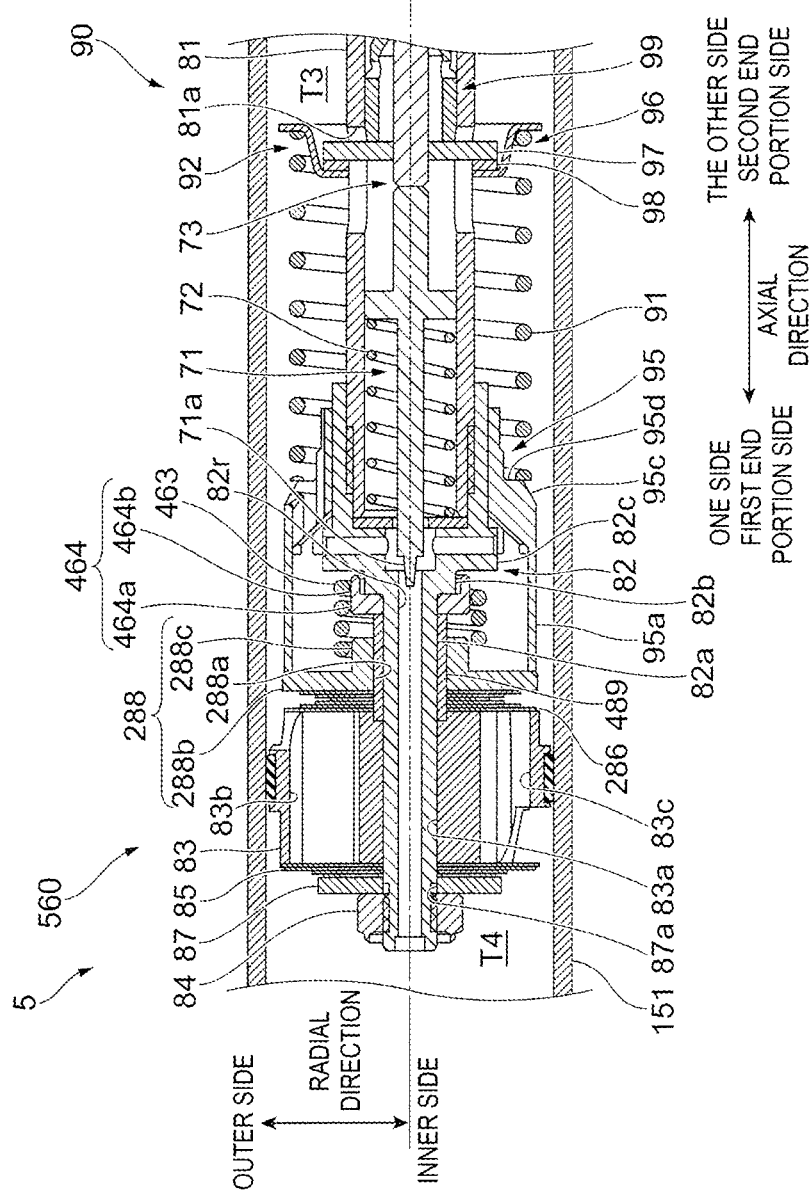
FIG. 11 is a cross-sectional view illustrating an example of a schematic configuration of a shock absorber 5 according to a fifth embodiment.

FIG. 11 is a cross-sectional view illustrating an example of a schematic configuration of a shock absorber 5 according to a fifth embodiment.

The shock absorber 5 according to the fifth embodiment is different from the shock absorber 2 according to the second embodiment in a main valve device 560 corresponding to the main valve device 260.

Hereinafter, differences of the main valve device 560 from the main valve device 260 will be described. Components having the same functions in the main valve device 560 and the main valve device 260 are denoted by the same reference numerals, and detailed description thereof will be omitted.

The main valve device 560 has a configuration in which the second spring 463, the guide 464, and the collar 489 provided in the main valve device 460 according to the fourth embodiment are applied to the configuration of the main valve device 260. The support member 87, the valve 85, the piston 83, the collar 489, and the guide 464 are interposed between the second portion 82b of the main bolt 82 and the nut 84 in a state in which the support member 87, the valve 85, the piston 83, the collar 489, and the guide 464 are in contact with members adjacent to one another.

In the main valve device 560 having the above-described configuration, in accordance with the pressure Ps in the oil chamber T4, the first valve 286 is opened and the first valve 286 and the first support member 288 slide relative to the collar 489. More specifically, when the pressure Ps is equal to or higher than a ninth pressure P9 determined according to rigidity of the first valve 286, among a plurality of disk valves of the first valve 286, a disk valve disposed at the one side of a central portion in the axial direction of the first valve 286 is opened. Further, when the pressure Ps is equal to or higher than a tenth pressure P10 (>the ninth pressure P9) determined according to the preset load F2 of the first spring 91 and the preset load F3 of the second spring 463, the first valve 286 and the first support member 288 move to the other side against spring forces of the first spring 91 and the second spring 463.

Therefore, according to the shock absorber 5, the ninth pressure P9 at which the first valve 286 starts to be opened can be changed by changing bending rigidity of the plurality of disk valves constituting the first valve 286. Further, according to the shock absorber 5, the tenth pressure P10 at which the first valve 286 and the first support member 288 start to move to the other side can be changed by changing the specifications (the preset load F3) of the second spring 463 and the preset load F2. Therefore, according to the shock absorber 5, a damping force can be adjusted over a larger moving speed range of the piston than the first comparative configuration and the second comparative configuration.

Sixth Embodiment

Figure 12:
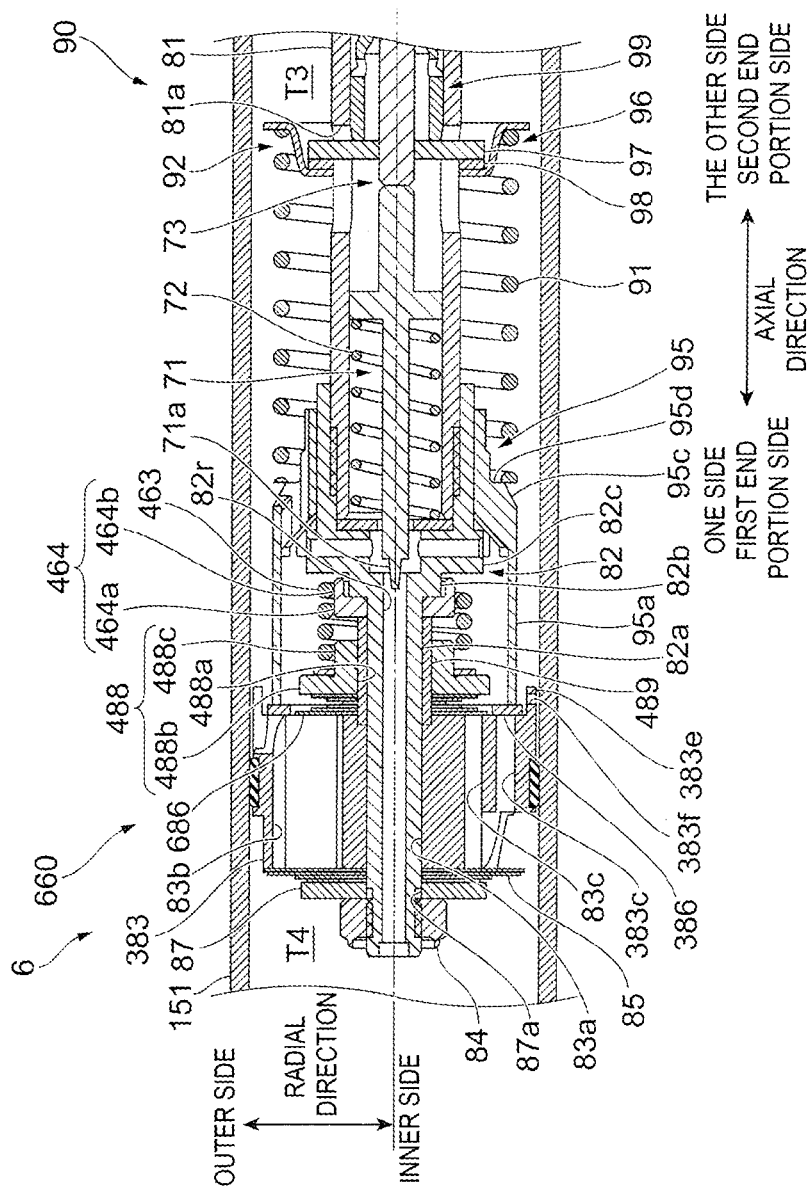
FIG. 12 is a cross-sectional view illustrating an example of a schematic configuration of a shock absorber 6 according to a sixth embodiment.

FIG. 12 is a cross-sectional view illustrating an example of a schematic configuration of a shock absorber 6 according to a sixth embodiment.

The shock absorber 6 according to the sixth embodiment is different from the shock absorber 3 according to the third embodiment in a main valve device 660 corresponding to the main valve device 360.

Hereinafter, differences of the main valve device 660 from the main valve device 360 will be described. Components having the same functions in the main valve device 660 and the main valve device 360 are denoted by the same reference numerals, and detailed description thereof will be omitted.

The main valve device 660 has a configuration in which the second spring 463, the guide 464, the first support member 488, and the collar 489 provided in the main valve device 460 according to the fourth embodiment are applied to the configuration of the main valve device 360. The first valve 686 corresponding to the first valve 86 of the main valve device 360 has an inner diameter larger than that of the first valve 86, so that the collar 489 can be disposed inside the first valve 686. The support member 87, the valve 85, the piston 383, the collar 489, and the guide 464 are interposed between the second portion 82b of the main bolt 82 and the nut 84 in a state in which the support member 87, the valve 85, the piston 83, the collar 489, and the guide 464 are in contact with members adjacent to one another.

In the main valve device 660 having the above-described configuration, in accordance with the pressure Ps in the oil chamber T4, the first valve 686 and the second valve 386 are opened and the first valve 686 and the first support member 488 slide relative to the collar 489. More specifically, when the pressure Ps is equal to or higher than an eleventh pressure P11 determined according to rigidity of the first valve 686, among a plurality of disk valves of the first valve 686, a disk valve disposed at the one side of a central portion in the axial direction of the first valve 686 is opened. Further, when the pressure Ps is equal to or higher than a twelfth pressure P12 (>the eleventh pressure P11) determined according to the preset load F3 of the second spring 463, the first valve 686 and the first support member 488 move to the other side against a spring force of the second spring 463. Further, when the pressure Ps is equal to or higher than a thirteenth pressure P13 (>the twelfth pressure P12) determined according to the preset load F2 of the first spring 91, the second valve 386 moves to the other side against a spring force of the first spring 91.

Therefore, according to the shock absorber 6, the eleventh pressure P11 at which the first valve 686 starts to be opened can be changed by changing specifications of the plurality of disk valves constituting the first valve 686. According to the shock absorber 6, the twelfth pressure P12 at which the first valve 686 and the first support member 488 start to move to the other side can be changed by changing the specifications (the preset load F3) of the second spring 463. Further, the thirteenth pressure P13 at which the second valve 386 starts to move to the other side can be changed by changing the preset load F2. Therefore, according to the shock absorber 6, a damping force can be adjusted over a larger moving speed range of the piston than the first comparative configuration and the second comparative configuration. Specifications of the first spring 91 and the second spring 463 may be set such that the pressure Ps at which the second valve 386 starts to move to the other side against the spring force of the first spring 91 is smaller than the pressure Ps at which the first valve 686 and the first support member 488 start to move to the other side against the spring force of the second spring 463.

Although the spring force of the first spring 91 is applied to the first valve 86, the first valve 486, the first valve 686, or the second valve 386 via the first transmission member 95 In the first, third, fourth, and sixth embodiments described above, the present invention is not particularly limited thereto. The spring force of the first spring 91 may be applied to the first valve 86, the first valve 486, the first valve 686, or the second valve 386 by bringing an end portion at the one side of the first spring 91 into contact with the first valve 86, the first valve 486, the first valve 686, or the second valve 386. Although the spring force of the first spring 91 is applied to the first support member 288 via the first transmission member 95 in the second and fifth embodiments described above, the present invention is not particularly limited thereto. The spring force of the first spring 91 may be applied to the first support member 288 by bringing an end portion at the one side of the first spring 91 into contact with the first support member 288.

The invention claimed is:
1. A shock absorber comprising:
a cylinder which has a first end in an axial direction thereof, said first end being fixed to a vehicle body of a vehicle with a saddle;

a rod which holds a piston at a first end of the rod, said piston configured to slide in the cylinder, and has a second end being at an opposite side to the first end of the rod;
a rod holding member that is fixed to the second end of the rod;
a first damping force generating portion which is fixed to the first end of the cylinder; and
a second damping force generation portion which is disposed to be movable in the axial direction in the cylinder,
wherein the second damping force generating portion includes:
 a first flow path which passes through the piston in the axial direction;
 a second flow path which passes through the piston in the axial direction and is provided outward of the first flow path in a radial direction of the piston;
 a first valve which opens and closes an opening portion of the first flow path;
 a second valve which opens and closes an opening portion of the second flow path; and
 an adjustment unit which adjusts a force required to open the second valve from an outer side of the rod.

2. The shock absorber according to claim 1,
wherein the adjustment unit includes:
 a first spring which applies a force in a closing direction to the second valve;
 a spring receiver which supports a second end of the first spring; and
 an adjustment portion which adjusts a position of the spring receiver.

3. The shock absorber according to claim 2,
wherein the adjustment unit further includes a first transmission member which is disposed between a first end of the first spring and the second valve, and which transmits the force of the first spring to the second valve, the first spring applying the force in the closing direction to the second valve.

4. A vehicle with a saddle comprising:
a vehicle body;
a front wheel disposed at a front side of the vehicle body in a traveling direction;
a rear wheel disposed at a rear side of the vehicle body in the traveling direction;
a first shock absorber disposed between the vehicle body and the front wheel; and
a second shock absorber disposed between the vehicle body and the rear wheel,
wherein at least the first shock absorber is the shock absorber according to claim 3.

5. A vehicle with a saddle comprising:
a vehicle body;
a front wheel disposed at a front side of the vehicle body in a traveling direction;
a rear wheel disposed at a rear side of the vehicle body in the traveling direction;
a first shock absorber disposed between the vehicle body and the front wheel; and
a second shock absorber disposed between the vehicle body and the rear wheel,
wherein at least the first shock absorber is the shock absorber according to claim 2.

6. The shock absorber according to claim 1,
wherein the adjustment unit further includes a first transmission member which is disposed between a first end of a first spring and the second valve, and which transmits a force of the first spring to the second valve, the first spring applying the force in a closing direction to the second valve.

7. The shock absorber according to claim 6,
wherein the second damping force generating portion includes:
 a first support member which is disposed inside the first transmission member and supports a surface of the first valve; and
 a second spring which is supported by the first support member and applies a force in a closing direction to the first valve.

8. The shock absorber according to claim 7,
wherein the adjustment unit includes:
 a contact member which is disposed inside the rod and comes into contact with a second transmission member which transmits a force to the spring receiver which supports a second end of the first spring; and
 an operation portion configured to change a position of the contact member by a rotation operation.

9. A vehicle with a saddle comprising:
a vehicle body;
a front wheel disposed at a front side of the vehicle body in a traveling direction;
a rear wheel disposed at a rear side of the vehicle body in the traveling direction;
a first shock absorber disposed between the vehicle body and the front wheel; and
a second shock absorber disposed between the vehicle body and the rear wheel,
wherein at least the first shock absorber is the shock absorber according to claim 8.

10. A vehicle with a saddle comprising:
a vehicle body;
a front wheel disposed at a front side of the vehicle body in a traveling direction;
a rear wheel disposed at a rear side of the vehicle body in the traveling direction;
a first shock absorber disposed between the vehicle body and the front wheel; and
a second shock absorber disposed between the vehicle body and the rear wheel,
wherein at least the first shock absorber is the shock absorber according to claim 7.

11. The shock absorber according to claim 6,
wherein the adjustment unit includes:
 a contact member which is disposed inside the rod and comes into contact with a second transmission member which transmits a force to the spring receiver which supports a second end of the first spring; and
 an operation portion configured to change a position of the contact member by a rotation operation.

12. A vehicle with a saddle comprising:
a vehicle body;
a front wheel disposed at a front side of the vehicle body in a traveling direction;
a rear wheel disposed at a rear side of the vehicle body in the traveling direction;
a first shock absorber disposed between the vehicle body and the front wheel; and
a second shock absorber disposed between the vehicle body and the rear wheel,
wherein at least the first shock absorber is the shock absorber according to claim 11.

13. A vehicle with a saddle comprising:
a vehicle body;

a front wheel disposed at a front side of the vehicle body in a traveling direction;
a rear wheel disposed at a rear side of the vehicle body in the traveling direction;
a first shock absorber disposed between the vehicle body and the front wheel; and
a second shock absorber disposed between the vehicle body and the rear wheel,
wherein at least the first shock absorber is the shock absorber according to claim 6.

14. A vehicle with a saddle comprising:
a vehicle body;
a front wheel disposed at a front side of the vehicle body in a traveling direction;
a rear wheel disposed at a rear side of the vehicle body in the traveling direction;
a first shock absorber disposed between the vehicle body and the front wheel; and
a second shock absorber disposed between the vehicle body and the rear wheel,
wherein at least the first shock absorber is the shock absorber according to claim 1.

15. A shock absorber comprising:
a cylinder which has a first end in an axial direction thereof, said first end being fixed to a vehicle body of a vehicle with a saddle;
a rod which holds a piston at a first end of the rod, said piston configured to slide in the cylinder, and has a second end being at an opposite side to the first end of the rod;
a rod holding member that is fixed to the second end of the rod;
a first damping force generating portion which is fixed to the first end of the cylinder; and
a second damping force generation portion which is disposed to be movable in the axial direction in the cylinder,
wherein the second damping force generating portion includes:
 a flow path which passes through the piston in the axial direction;
 a valve which opens and closes an opening portion of the flow path; and
 an adjustment unit which adjusts a force required to open the valve from an outer side of the rod,
wherein the adjustment unit includes:
 a first spring which applies a force in a closing direction to the valve;
 a spring receiver which supports a second end of the first spring; and
 an adjustment portion which adjusts a position of the spring receiver,
wherein the adjustment unit further includes a first transmission member which abuts the valve at a first end thereof, is disposed between a first end of the first spring and the valve and transmits the force applied by the first spring to the valve, and
wherein the second damping force generating portion includes:
 a first support member which is disposed inside the first transmission member and supports a surface of a second end of the valve; and
 a second spring whose first end is supported by the first support member, said second spring applying a force in the closing direction to the valve.

16. The shock absorber according to claim 15,
wherein the adjustment portion includes:
a contact member which is disposed inside the rod and comes into contact with a second transmission member which transmits a force to the spring receiver by a first end of the second transmission member; and
an operation portion which can change a position of the contact member by a rotation operation.

17. A vehicle with a saddle comprising:
a vehicle body;
a front wheel disposed at a front side of the vehicle body in a traveling direction;
a rear wheel disposed at a rear side of the vehicle body in the traveling direction;
a first shock absorber disposed between the vehicle body and the front wheel; and
a second shock absorber disposed between the vehicle body and the rear wheel,
wherein at least the first shock absorber is the shock absorber according to claim 16.

18. A vehicle with a saddle comprising:
a vehicle body;
a front wheel disposed at a front side of the vehicle body in a traveling direction;
a rear wheel disposed at a rear side of the vehicle body in the traveling direction;
a first shock absorber disposed between the vehicle body and the front wheel; and
a second shock absorber disposed between the vehicle body and the rear wheel,
wherein at least the first shock absorber is the shock absorber according to claim 15.

* * * * *